US008457288B2

(12) United States Patent
Tischer et al.

(10) Patent No.: US 8,457,288 B2
(45) Date of Patent: *Jun. 4, 2013

(54) MULTI-MODE IVR

(75) Inventors: Steven N. Tischer, Atlanta, GA (US);
Robert J. Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,161

(22) Filed: Nov. 29, 2011

(65) Prior Publication Data

US 2012/0069976 A1    Mar. 22, 2012

Related U.S. Application Data

(63) Continuation of application No. 11/627,209, filed on Jan. 25, 2007, now Pat. No. 8,085,909.

(51) Int. Cl.
*H04M 1/64*    (2006.01)

(52) U.S. Cl.
USPC ........................................ 379/88.25

(58) Field of Classification Search
USPC .......................... 379/88.22–88.25
See application file for complete search history.

(56) References Cited

U.S. PATENT DOCUMENTS

| 6,370,238 B1 | 4/2002 | Sansone et al. |
| 6,782,089 B1 | 8/2004 | Blackburn et al. |
| 7,065,188 B1 | 6/2006 | Mei et al. |
| 7,158,936 B2 | 1/2007 | Denenberg et al. |
| 7,260,537 B2 | 8/2007 | Creamer et al. |
| 7,346,607 B2 | 3/2008 | Daniels et al. |
| 7,386,103 B1 | 6/2008 | Chahal |
| 8,085,909 B2 | 12/2011 | Tischer et al. |
| 2007/0220127 A1 | 9/2007 | Adams et al. |

OTHER PUBLICATIONS

Tischer; Non-Final Office Action mailed Apr. 18, 2011 for U.S. Appl. No. 11/627,209, filed Jan. 25, 2007.
Tischer; Notice of Allowance mailed Oct. 11, 2011 for U.S. Appl. No. 11/627,209, filed Jan. 25, 2007.

*Primary Examiner* — Simon Sing
(74) *Attorney, Agent, or Firm* — Greenblum & Bernstein, P.L.C.

(57) ABSTRACT

Included are embodiments of systems and methods for providing information. At least one embodiment of such a method includes facilitating establishment of a communication between a user on a communications device and an interface server, the interface server being configured to provide data related to an information tree to the user, the information tree being configured with a plurality of options. Some embodiments include facilitating navigation of a user through the information tree and receiving a first version of a marker from the user, the marker being configured to mark at least one position in the information tree. Still some embodiments include associating the received first version of the marker with a position in the information tree.

20 Claims, 22 Drawing Sheets

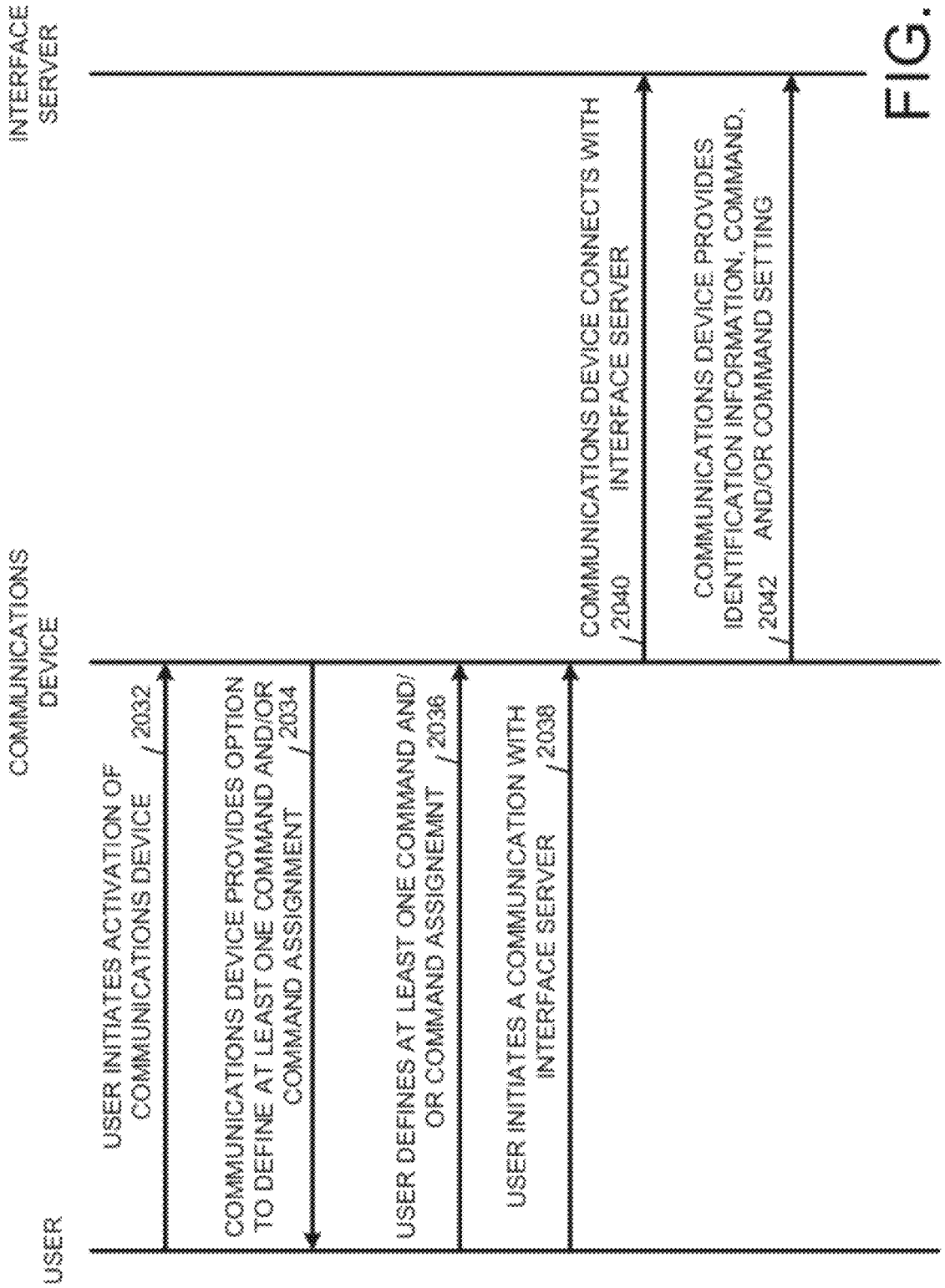

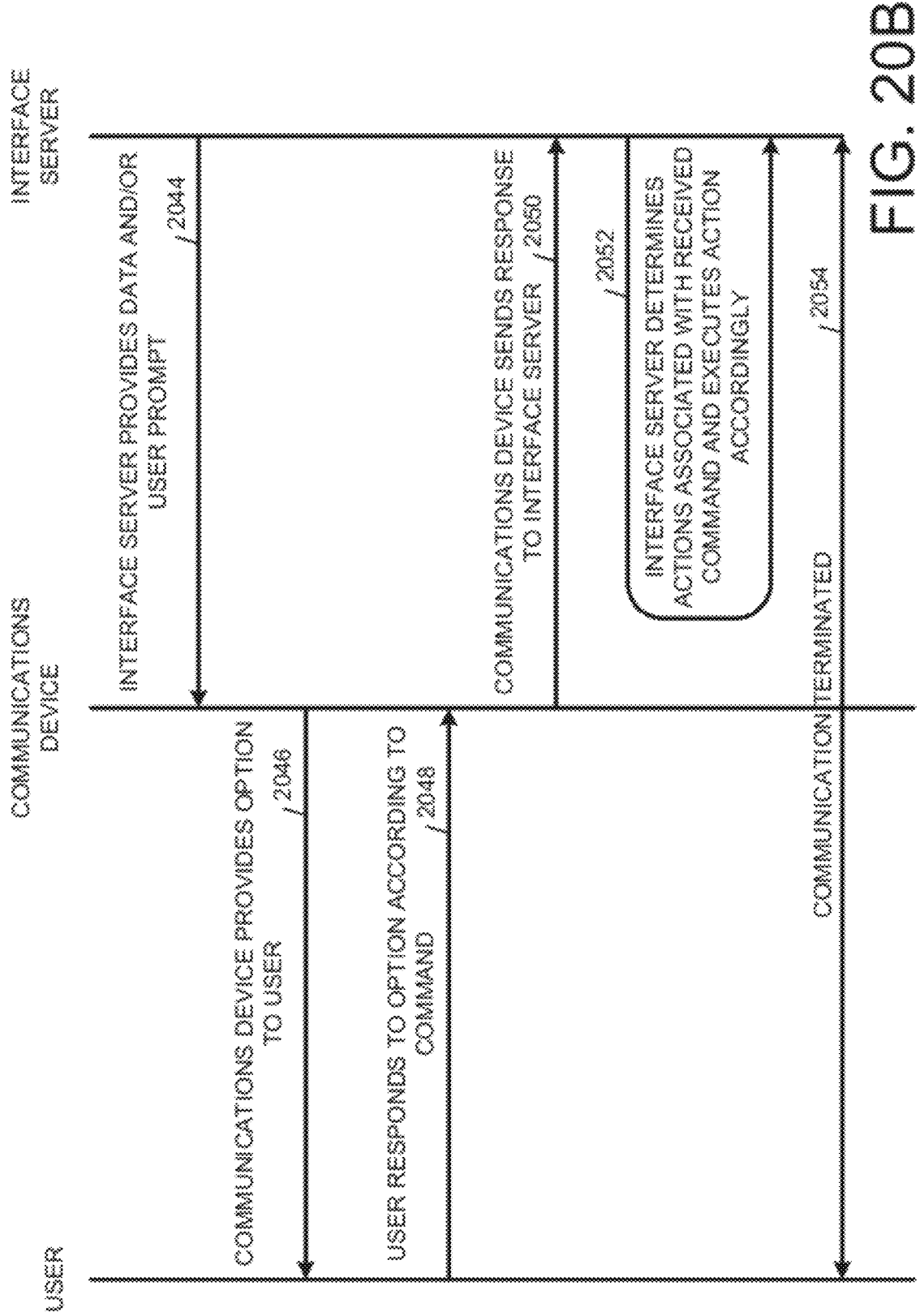

MULTI-MODE IVR

CROSS-REFERENCE TO RELATED APPLICATION

This application is a continuation of copending U.S. utility application entitled, "Multi-Mode IVR," having Ser. No. 11/627,209, filed Jan. 25, 2007, which is entirely incorporated herein by reference.

TECHNICAL FIELD

This disclosure relates to a multi-mode Interactive Voice Response (IVR) session.

BACKGROUND

Users often desire customer service and/or otherwise place calls that result in interaction with an Interactive Voice Response (IVR) system. During an IVR session, the IVR may present the user with options for navigating to the desired destination. As a nonlimiting example, the user may input an address (e.g., dial a telephone number, enter an Internet Protocol (IP) address, etc.) that is associated with an IVR. Upon connection of a communication session with the IVR, the IVR may present the user with a plurality of options. Depending on the particular configuration, the user may respond to the provided options with a Dial-Tone Multi-Frequency (DTMF) input, a voice input and/or other input. The IVR may continue to provide subsequent options to the user, based on the received user input, until a desired destination is achieved.

While many IVRs are configured to provide users with desired information, oftentimes a user is disconnected from the IVR prior to receiving the desired information or reaching the desired destination. Additionally, users may select one or more options that do not correspond to the desired destination. When such a scenario occurs, the user must return to the first options of the IVR and begin the process again.

Thus, a heretofore unaddressed need exists in the industry to address the aforementioned deficiencies and inadequacies.

SUMMARY

Included are embodiments of systems and methods for providing information. At least one embodiment of such a method includes facilitating establishment of a communication between a user on at least one communications device and an interface server, the interface server being configured to provide data related to an information tree to the user, the information tree being configured with a plurality of options. Some embodiments include facilitating navigation of a user through the information tree and receiving a first version of a marker from the user, the marker being configured to mark at least one position in the information tree. Still some embodiments include associating the received first version of the marker with a position in the information tree.

Also included are embodiments of a computer readable medium. At least one embodiment includes first facilitating logic configured to facilitate establishment of a communication between a user on at least one communications device and an interface server, the interface server being configured to provide data related to an information tree to the user, the information tree being configured with a plurality of options. Some embodiments include second facilitating logic configured to facilitate navigation of a user through the information tree and first receiving logic configured to receive a first version of a marker from the user, the marker being configured to mark at least one position in the information tree. Still some embodiments include associating logic configured to associate the received first version of the marker with a position in the information tree.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 20A is a sequence diagram illustrating an exemplary embodiment of a process for providing a setting for an IVR, such as may be provided by the interface server from FIG. 3.

FIG. 20B is a continuation of the sequence diagram from FIG. 20A.

DETAILED DESCRIPTION

Embodiments of this disclosure add rich media features to Interactive Voice Response (IVR) systems by incorporating protocols such as Voice over Internet Protocol (VoIP) for cross-mode digital interaction. Additionally, messaging and user interface improvements based on Motion Picture Experts Group-3 (MPEG3) and/or MPEG4 allow aural and other thumbnails and markers for marking specific locations in an information tree of the IVR. Additionally, some embodiments include video enhanced collaborative interaction among locations in the information tree. Some embodiments may include media enhanced programmable buttons to control these features. These embodiments may be configured, whereby specific media components such as photos and/or videos can be shown in real time on a button (or other option) that corresponds to the locations and/or specific features available at a location in the information tree. As a nonlimiting example, a user interface associated with an IVR may display a photo of Grandma and a BellSouth® logo, indicating where Grandma can access her BellSouth® accounts from her cellular telephone. By selecting the photo, Grandma may be presented with her account information.

Additionally, at least one embodiment may be configured with a user device, where the user can assign a type of marker (e.g., assign a certain key sequence, music, picture, etc.) such that if the user is disconnected from the IVR (and/or navigates to an undesired location in the information tree of the IVR), the user can return to a desired location in the IVR by inputting the marker to the device. The device may also be configured to navigate the IVR to the desired location in the information tree.

Similarly, at least one embodiment includes a network that may be configured to receive an identifier, a marker, and/or other indication to document a user's navigation through the IVR. If the user is disconnected from the IVR, the data related to the navigation may be available to the user (with the same or different user device) when the user returns. This can provide a configuration where, when the user returns, the user can automatically return to a predetermined place in the IVR. In this embodiment, the network may also be configured to store the navigation, as well as the marker to determine the user's desired destination.

Figure 1:
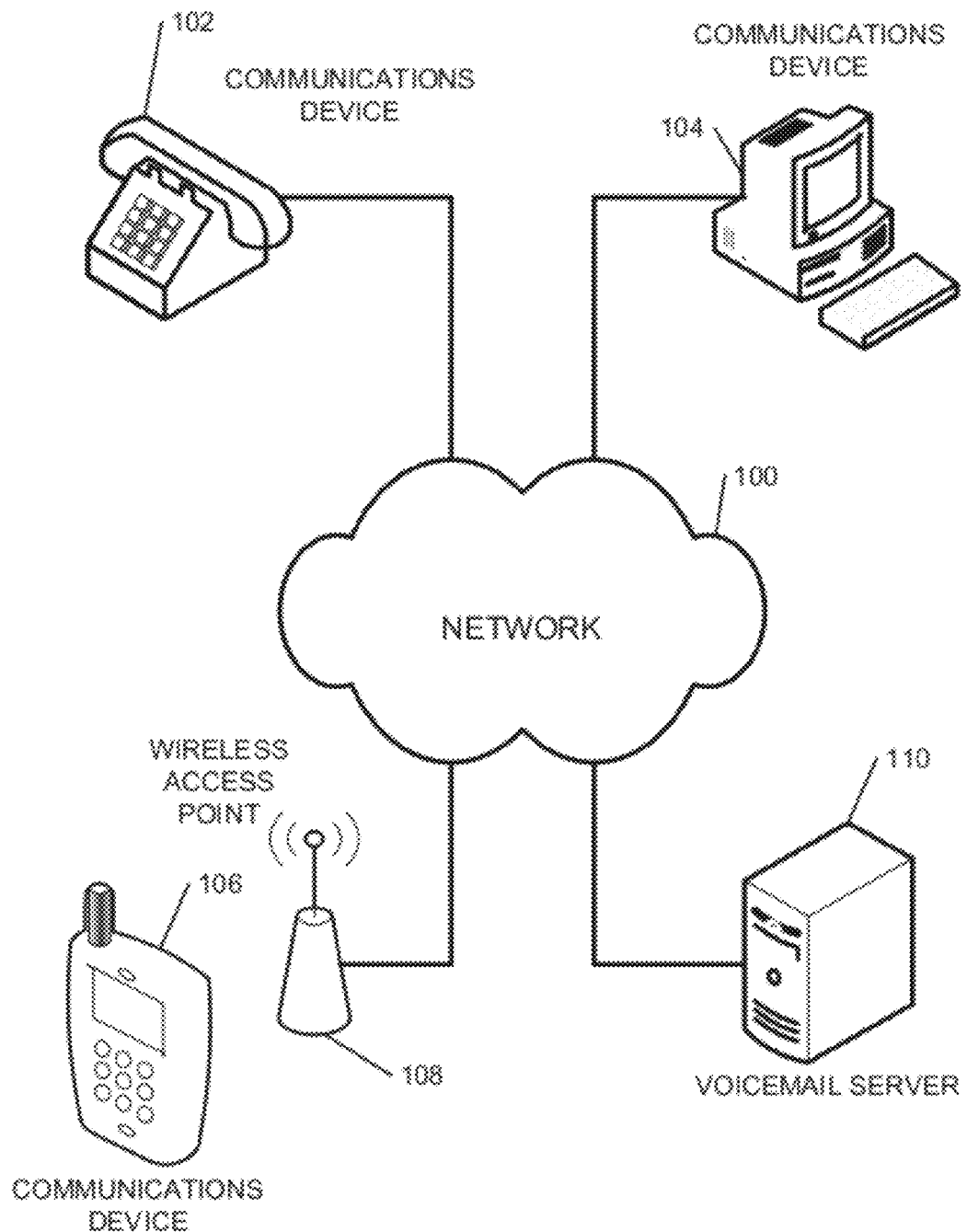
FIG. 1 is a diagram illustrating an exemplary embodiment of a network configuration for providing users with information.

FIG. 1 is a diagram illustrating an exemplary embodiment of a network configuration for providing users with information. As illustrated, a plurality of users may be connected via an external network such as a communications network 100. The communications network 100 can include, for example, the Internet, a Wi-Fi® network (IEEE 802.11 compatible), a Wi-Max network (IEEE 802.16 compatible), a Public Switched Telephone Network (PSTN), a cellular communications network, the Internet, and/or other communications mediums. Users may access the communications network 100 via a communications device 102, a communications device 104, and/or a communications device 106 (via a wireless access point 108).

It should be appreciated that the network 100, the communications devices 102, 104, 106 (via the wireless access point 108), and connections illustrated in FIG. 1 are shown by way of example and are not intended to limit this disclosure. This disclosure may be applicable to any communications device, connection, and network that supports voice, data, and/or other types of communications.

One should note that depending on the type of communication desired, different functionality may be utilized. More specifically, while the communications devices 102 and 106 may be configured to facilitate voice communications over a cellular network and/or a PSTN, these devices may also be configured for data communications via the Internet. Similarly, the communications devices 102 and 106 may also be configured to facilitate communications via a Wi-Fi® network and/or a Wi-Max network. As a nonlimiting example, if a user operating the communications device 106 wishes to make a cellular communication, the user can input the address (e.g., telephone number) of the called party device. This address can be sent to the wireless access point 108 (which may include a cellular antenna and/or other component), configured to send the communication request to the network 100. The network 100 may employ one or more cellular networks, PSTNs and/or other networks for facilitating the communication. Upon connecting the communications device 104 with a called party device, such as with the communications device 102, communication may begin.

Similarly, if a user operating the communications device 104 wishes to access a website (and/or other data associated with the Internet), the user can send a communication request, which may include an address, such as a Uniform Resource Locator (URL) or other Uniform Resource Identifier (URI). The request can be sent to the desired computing device (such as a server data storage) via the network 100, which may include the Internet, a Wi-Max network a Wi-Fi® network, cellular network, and/or other network. The desired computing device can then respond by sending the requested data to the communications device 104 via the same (or similar) transmission mediums.

Also included in the nonlimiting example of FIG. 1 is a voicemail server 110. The voicemail server 110 may be configured to serve one or more user accounts. More specifically, in at least one embodiment, the voicemail server 110 may be configured to provide voicemail services for a telephone line coupled to the communications device 102. The voicemail server 110 may be configured to receive a redirected call intended for a user associated with the communications device 102. If the network 100 determines that a user is currently not available on the communications device 102, the call may be redirected to the voicemail server 110. Similar to interface servers 218*a*-218*c* (FIG. 2), the voicemail server 110 may be configured to provide the caller with an IVR for providing options for leaving a message.

Figure 2:
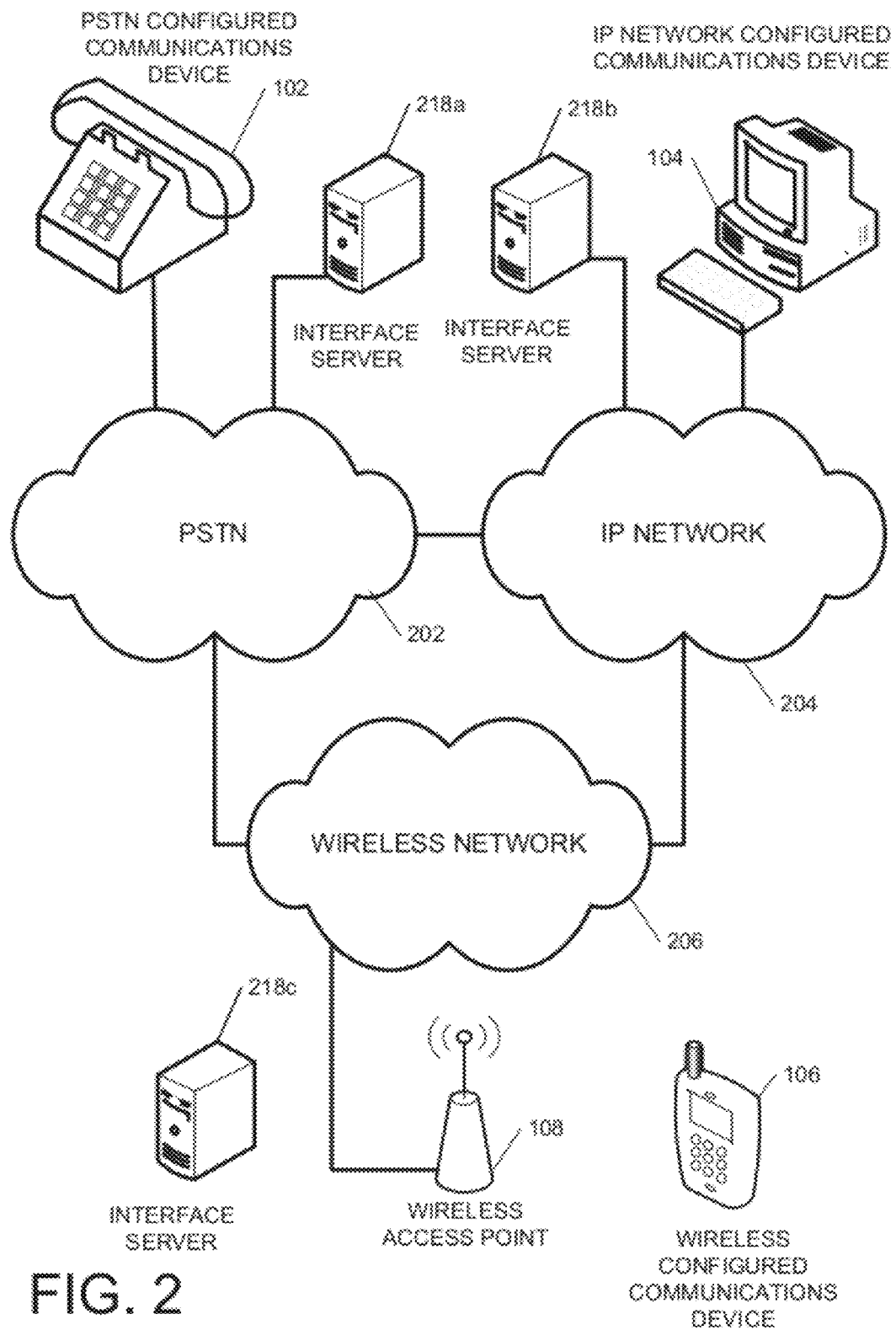
FIG. 2 is a diagram illustrating an exemplary embodiment of a network configuration with a plurality of interface servers, similar to the diagram from FIG. 1.

FIG. 2 is a diagram illustrating an exemplary embodiment of a network configuration with a plurality of interface servers, similar to the diagram from FIG. 1. As illustrated in the nonlimiting example of FIG. 2, a PSTN configured a communications device, such as the communications device 102 may be coupled to a PSTN 202. Also coupled to the PSTN 202 is the Interface server 218*a*. The interface server 218*a* may be a PSTN based server and may be configured to provide an information tree to a user. More specifically, in response to a user dialing a predetermined address associated with the interface server 218*a*, a user may establish a communications session with the interface server 218*a*. The interface server 218*a* may be configured to provide an automated Interactive Voice Response (IVR) interface to the user. The IVR may be configured to provide an information tree of options for the user to quickly reach a desired portion of the IVR interface.

As a nonlimiting example, a user may call a BellSouth® directory number looking for information related to starting new Direct Service Line (DSL) service. In response to establishing a communications session with the BellSouth® interface server 218*a*, the interface server 218*a* can provide the user with an option to view a current bill, an option to receive technical support, an option for employment opportunities and an option to start new service. Upon selecting the option to start new service, the IVR may provide the user with an option to start new dial-up service, an option for DSL service and an option for Very High Bit Rate DSL (VDSL) service. Upon selection of the second option, the user may then be provided with the desired information.

Also included in the nonlimiting example of FIG. 2, is an Internet Protocol (IP) network configured communications device, such as the communications device 104. The IP network configured communications device 104 may be configured to communicate via an IP network 204, which may utilize VoIP protocols and/or other IP protocols. Also coupled to the IP network 204 is the IP configured interface server 218*b*, which may be configured to provide similar functionality as the PSTN based interface server 218*a* in an IP environment. The IP network 204 is also coupled to the PSTN 202 and a wireless network 206.

The wireless network 206 is coupled to one or more of the wireless access points 108, which may operate on a wireless cellular protocol, on an IEEE 802.11 or other wireless protocol to communicate with a wireless configured communications device, such as the communications device 106 and/or the wireless configured interface server 218*c*.

Figure 3:
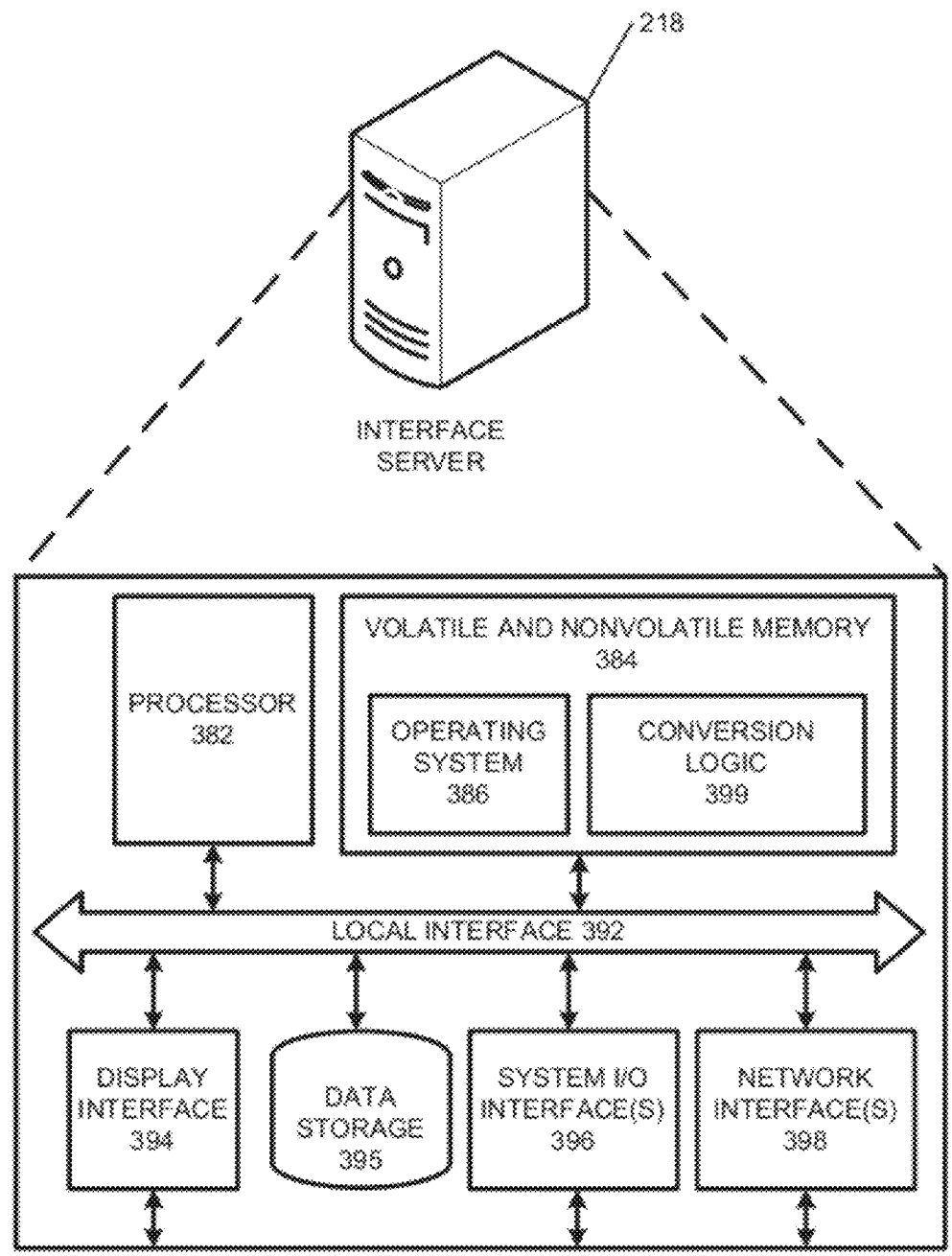
FIG. 3 is a diagram illustrating an exemplary embodiment of components that may be present in an interface server, such as the interface server from FIG. 2.

FIG. 3 is a diagram illustrating an exemplary embodiment of components that may be present in an interface server 218, such as the interface servers 218*a*-218*c* from FIG. 2. Although a wire-line communications device is illustrated, this discussion can be applied to wireless devices, as well. Generally, in terms of hardware architecture, as shown in FIG. 3, the interface server 218 includes a processor 382, volatile and nonvolatile memory 384, a display interface 394, data storage 395, one or more input and/or output (I/O) device interface(s) 396, and/or one or more network interfaces 398 that are communicatively coupled via a local interface 392. The local interface 392 can include, for example but not limited to, one or more buses or other wired or wireless connections. The local interface 392 may have additional elements, which are omitted for simplicity, such as controllers, buffers (caches), drivers, repeaters, and receivers to enable communications. Further, the local interface 392 may include address, control, and/or data connections to enable appropriate communications among the aforementioned components. The processor 382 may be a device for executing software, particularly software stored in the volatile and nonvolatile memory 384. The processor 382 can include any custom made or commercially available processor, a central processing unit (CPU), an auxiliary processor among several processors associated with the interface server 218, a semiconductor based microprocessor (in the form of a microchip or chip set), a macroprocessor, and/or generally any device for executing software instructions.

The memory 384 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 384 may incorporate electronic, magnetic, optical, and/or other types of storage media. One should note that the memory 384 can have a distributed architecture (where various components are situated remote from one another), but can be accessed by the processor 382.

The software in the volatile and nonvolatile memory 384 may include one or more separate programs, each of which includes an ordered listing of executable instructions for implementing logical functions. In the example of FIG. 3, the software in the volatile and nonvolatile memory 384 may include IVR logic 399, as well as an operating system 386. The operating system 386 may be configured to control the execution of other computer programs and provide scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the operating system 386.

The Input/Output devices that may be coupled to system I/O Interface(s) 396 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are the one or more network interfaces 398 for facilitating communication with one or more other devices. More specifically, the network interface 398 may include any component configured to facilitate a connection with another device. While in some embodiments, among others, the interface server 218 can include the network interface 398 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include the network interfaces 398 for communicating via a wired connection. Such interfaces may be configured with Universal Serial Bus (USB) interfaces, serial ports, and/or other interfaces.

If the interface server 218 includes a personal computer, workstation, or the like, the software in the volatile and nonvolatile memory 384 may further include a basic input output system (BIOS) (omitted for simplicity). The BIOS is a set of software routines that initialize and test hardware at startup, start the operating system 386, and support the transfer of data among the hardware devices. The BIOS is stored in ROM so that the BIOS can be executed when the communications device 106 is activated.

When the interface server 218 is in operation, the processor 382 may be configured to execute software stored within the volatile and nonvolatile memory 384, to communicate data to and from the volatile and nonvolatile memory 384, and to generally control operations of the communications device 106 pursuant to the software. Software in memory, in whole or in part, may be read by the processor 382, perhaps buffered within the processor 382, and then executed.

One should note that while the description with respect to FIG. 3 includes the interface server 218 as a single component, this is a nonlimiting example. More specifically, in at least one embodiment, the interface server 218 can include a plurality of servers, personal computers, and/or other devices. Similarly, while the description of FIG. 3 describes the interface server 218, this is also a nonlimiting example, as other components may also be included in this description, such as SIP locator and/or other components.

Additionally, while the IVR logic 399 is illustrated in FIG. 3 as a single software component, this is also a nonlimiting example. In at least one embodiment, the IVR logic 399 may include one or more components, embodied in software, hardware, and/or firmware. Additionally, while the IVR logic 399 is depicted as residing on a single computing device, as the interface server 218 may include one or more devices, the IVR logic 399 may include one or more components residing on one or more different devices.

The embodiments disclosed herein can be implemented in hardware, software, firmware, or a combination thereof. At least one embodiment disclosed herein is implemented in software and/or firmware that is stored in a memory and that is executed by a suitable instruction execution system. If implemented in hardware, as in an alternative embodiment, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
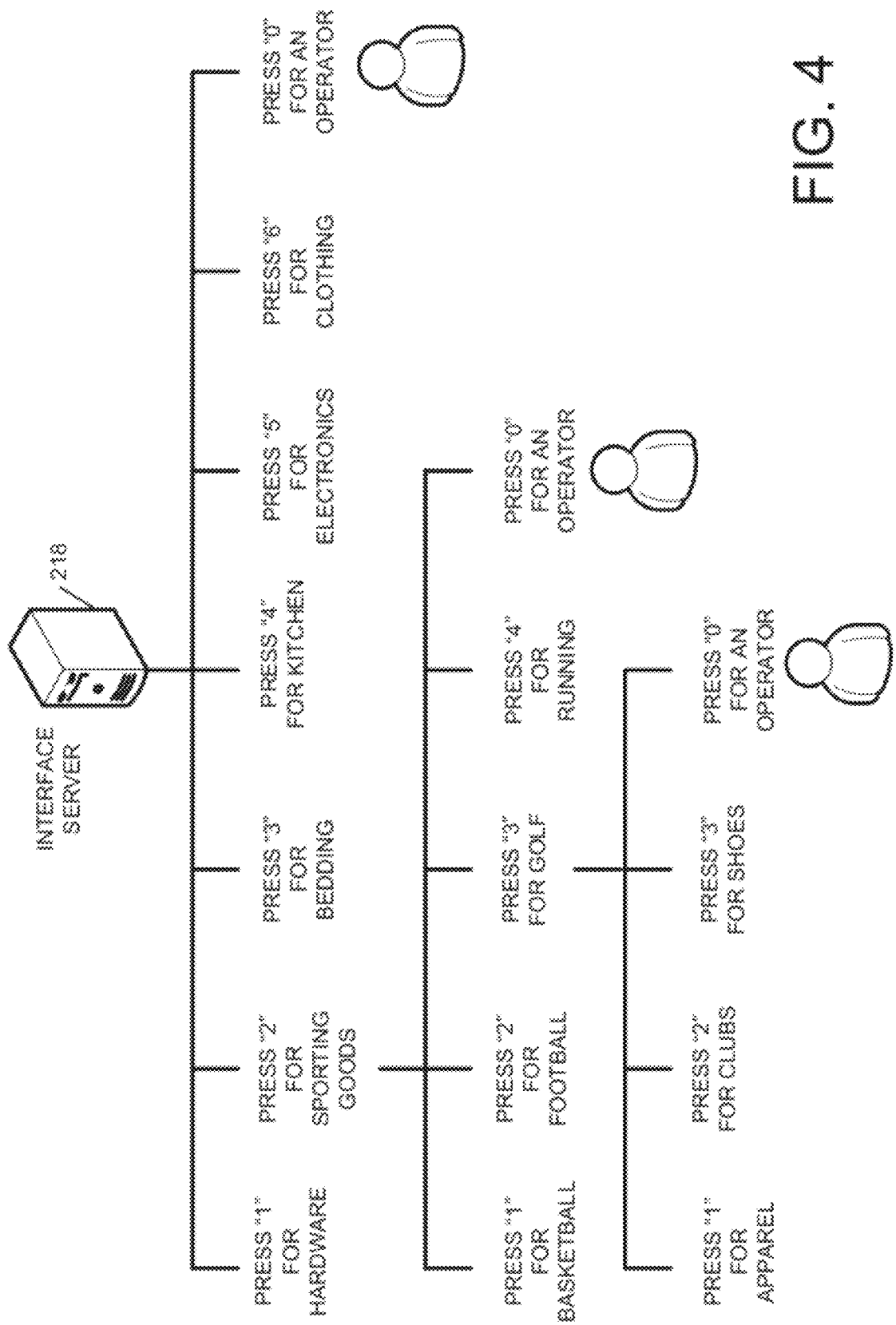
FIG. 4 is a diagram illustrating an exemplary embodiment of options that may be provided to a user upon the establishment of a communications session with an interface server, such as the interface server from FIG. 3.

FIG. 4 is a diagram illustrating an exemplary embodiment of options that may be provided to a user upon the establishment of a communications session with an interface server, such as the interface server 218 from FIG. 3. As illustrated in the nonlimiting example of FIG. 4, the interface server 218 may be configured to provide an information tree for providing information to a user. More specifically, upon establishing a communications session with the interface server 218, a user may be provided with the first tier of options. A first option may indicate that by pressing "1," the user can be provided with hardware options. A second option may indicate that by pressing "2," the user may be provided with sporting goods options. A third option may indicate that by pressing "3," the user may be provided with bedding options. A fifth option may indicate that by pressing "5," the user may be provided with electronics options. A sixth option may indicate that by pressing "6," the user may be provided with clothing options. A seventh option may indicate that by pressing "0," the user may be connected with a representative.

In response to selection of the second option, the user may be presented with a plurality of second tier options. More specifically, a first second tier option may indicate that by pressing "1," the user may be provided with basketball options. A second second tier option may indicate that by pressing "2," the user may be provided with football options. A third second tier option may indicate that by pressing "3," the user may be presented with golf options. A fourth second tier option may indicate that by pressing "4," the user may be presented with running options. A fifth second tier option may indicate that by pressing "0" the user may be connected with a representative.

In response to selection of the third second tier option, the user may be presented with a plurality of third tier options. More specifically, a first third tier option may indicate that by pressing "1," the user may be presented with apparel options. A second third tier option may indicate that by pressing "2," the user is presented with clubs options. A third third tier option may indicate that by pressing "3," the user is presented with shoes options. A fourth third tier option may indicate that by pressing "0," the user may be connected with a representative.

As illustrated, the user may navigate numerous tiers of options before reaching the desired information. As such, if the user is disconnected with the IVR or selects an undesirable option, oftentimes the user will be forced to restart from the first tier of options.

One should note that the options provided in the information tree depicted in FIG. 4 are merely a nonlimiting example. Additionally, depending on the particular configuration, the information tree may be presented as an audio presentation of options and/or a visual presentation of options. Further, while only one set of second tier options and one set of third tier options are illustrated in FIG. 4, this is also a nonlimiting example, as one or more of the first tier options may have corresponding second tier options, third tier options, fourth tier options, etc.

Figure 5:
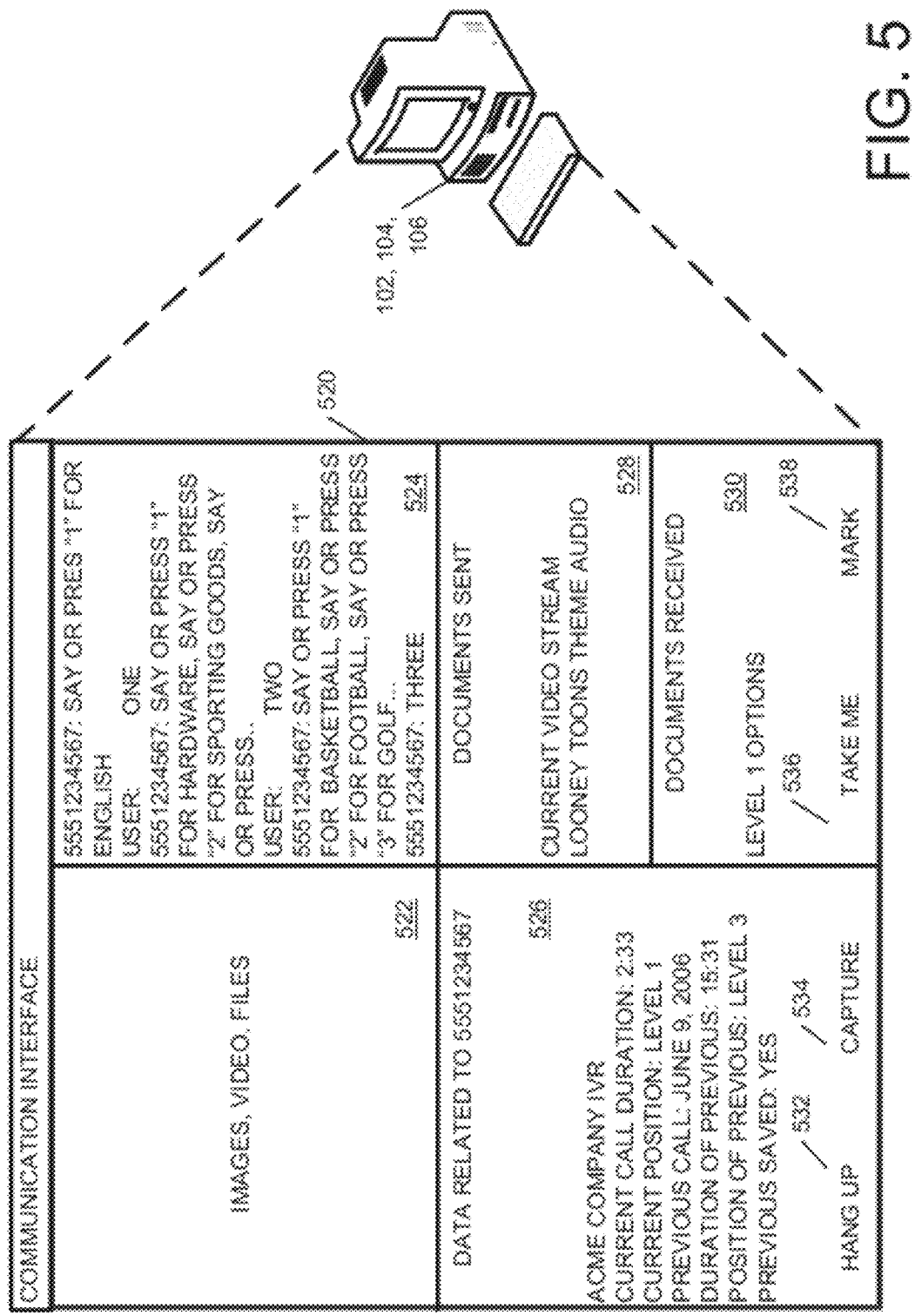
FIG. 5 is a diagram of a user interface that may be presented to a user that interacts with an interface server, such as the interface server from FIG. 3.

FIG. 5 is a diagram of a user interface that may be presented to a user that interacts with an interface server, such as the interface server 218 from FIG. 3. More specifically, as illustrated in the nonlimiting example of FIG. 5, a communication interface 520 may be presented to a user via one or more of the communications devices 102, 104, 106, and/or other communications device. Included in the communication interface 520 is a display window 522 for presenting images, video, and/or files associated with an established communications session. According to at least one exemplary embodiment, displayed in data section 526 are data associated with the one or more other parties that are associated with the current communications session, a duration of the communication session, a current position in the information tree, and a date of a previous communications session. Additionally included in this nonlimiting example is a duration of the previous communications session, a position in the information tree during the previous communications session, and an indication of whether the previous data was saved at the communications device 102, 104, 106 and/or at the interface server 218. Also included are a transcript section 524, a sent section 528, and a received section 530. According to at least one exemplary embodiment, in the transcript section 524 is a transcript of the options presented by the IVR as well as data associated with the user's selections. In the sent section 528 is an indication of data and/or files sent to the IVR. In the received section 530 is data received from the IVR.

Also included in the nonlimiting example of FIG. 5 is a hang up option 532, a capture option 534, a take me option 536, and a mark option 538. More specifically, the hang up option 532 may be configured to disconnect the current communications session. The capture option 534 may be configured to capture potential markers, as discussed in more detail below. The take me option 536 may be configured to resume a previous communications session with the IVR, as discussed in more detail below. The mark option 538 may be configured to mark a current communications session for future retrieval.

Figure 6:
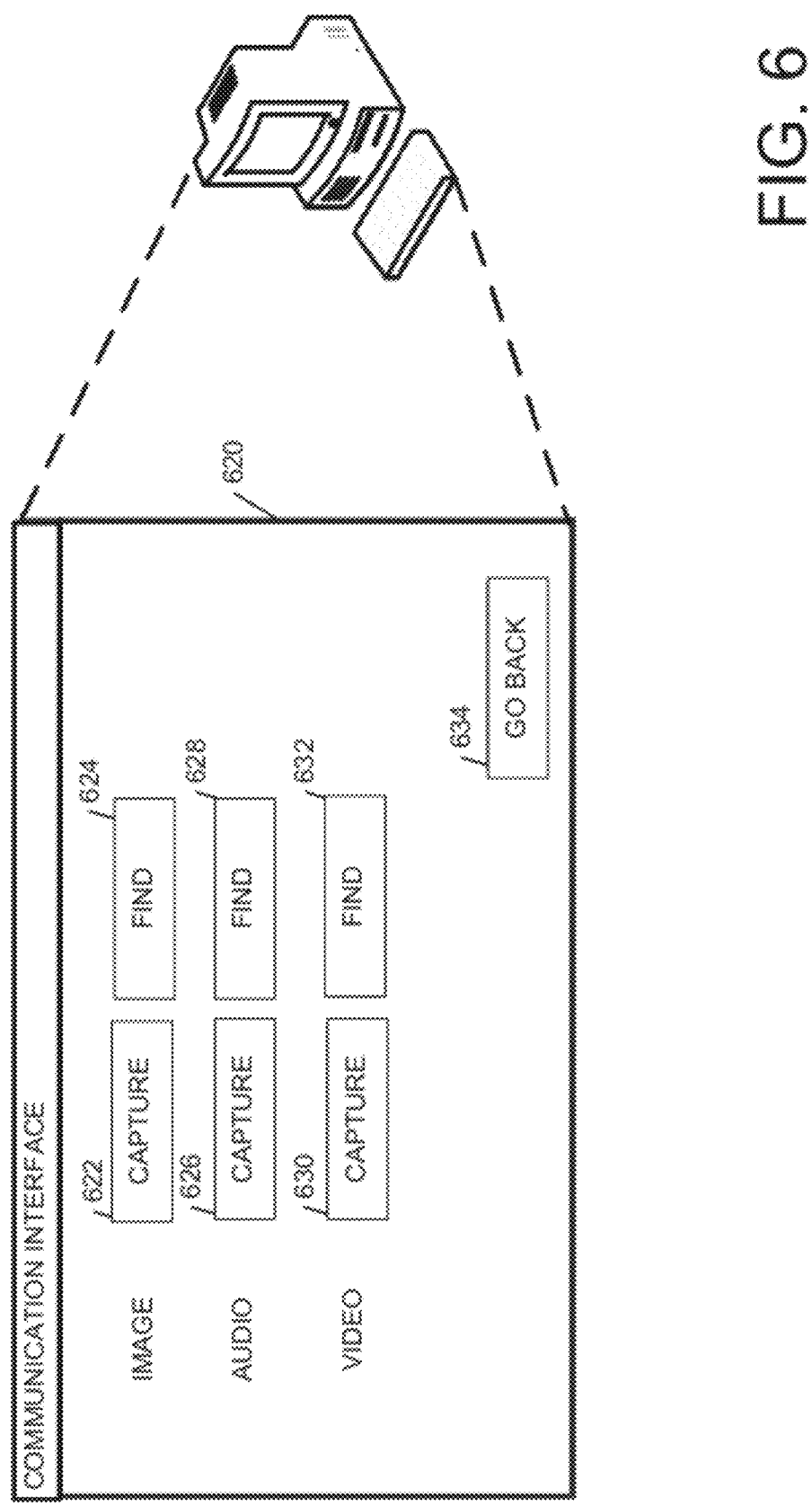
FIG. 6 is a diagram illustrating a user interface that may facilitate storage and/or location of an IVR marker, similar to the interface from FIG. 5.

FIG. 6 is a diagram illustrating a user interface that may facilitate storage and/or location of an IVR marker, similar to the interface 520 from FIG. 5. As illustrated in the nonlimiting example of FIG. 6, communication interface 620 may include options that may be accessible in response to a user selection of the capture option 534. More specifically, in at least one embodiment, the user can capture an image by selecting image capture option 622. In operation, a user can capture an image via a camera or other image capture device, and/or via capturing a screenshot by a local operating system and/or other local application. Similarly, by selecting a find option 624, the user can locate a previously captured image that may be stored locally and/or remotely from the communications device 102, 104, 106. Also included in the nonlimiting example of FIG. 6 is an audio capture option 626. The audio capture option 626 can facilitate recording of audio data for use as a marker. An audio find option 628 can be selected for finding previously captured audio data. A video capture option 630 may be utilized for capturing video data. A video find option 632 may be utilized for finding previously captured video data. A go back option 634 can return the user to the user interface 520 from FIG. 5.

One should also note that while capture and/or location of image data, audio data, control data, and/or video data may be facilitated via a graphical user interface (GUI), this is a nonlimiting example. More specifically, in at least one exemplary embodiment a user may be presented with these options in an audio exchange with the communications device 102, 104, 106.

Figure 7:
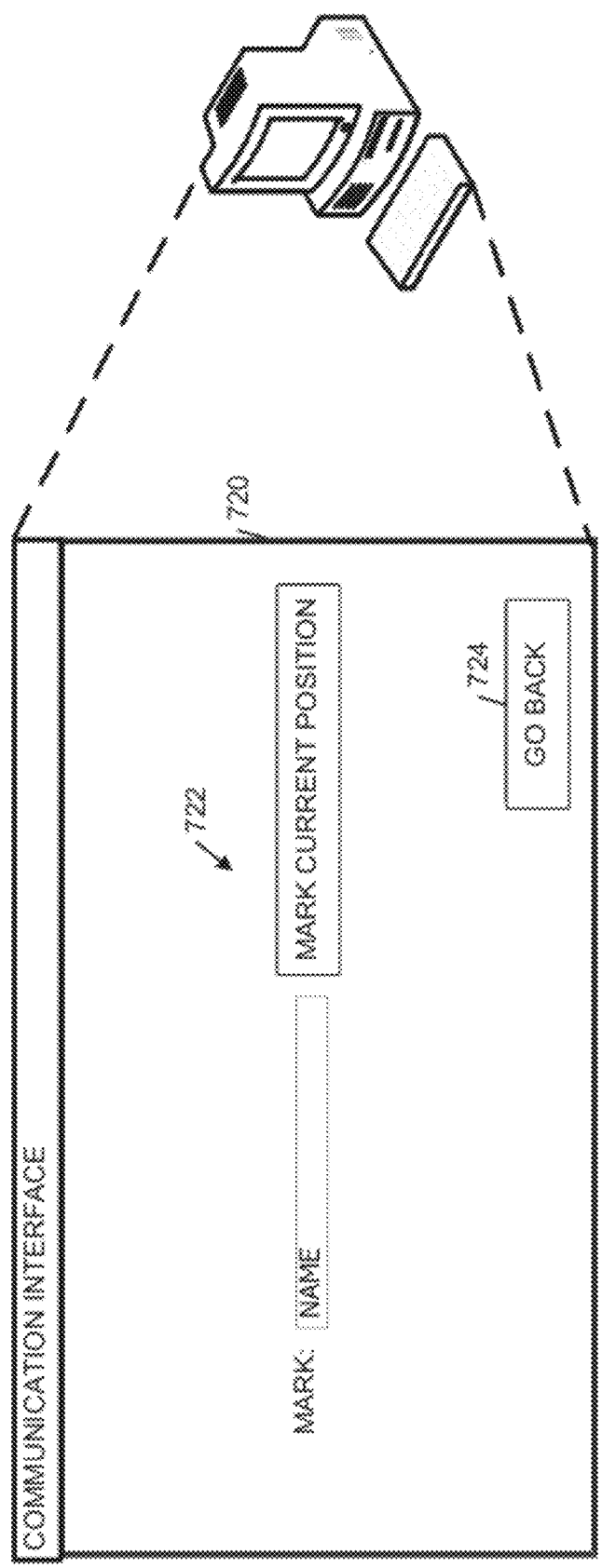
FIG. 7 is a diagram illustrating a user interface that may facilitate marking of a place in an IVR session, similar to the diagram from FIG. 6.

FIG. 7 is a diagram illustrating a user interface that may facilitate marking of a place in an IVR session, similar to the diagram from FIG. 6. As illustrated in the nonlimiting example of FIG. 7, in response to selection of the mark option 538, the user may be presented with a communication interface 720. More specifically, a user can mark a current position in an information tree (e.g., see FIG. 4) that is presented as part of an IVR. The user can select the desired marker (which may include a sound, image, video, etc.) by entering a mark name (and/or location) in a "mark current position" option 722. By selecting the "mark current position" option 722, the user's current position in an information tree may be stored and associated with the select mark. The user can return to the interface from FIG. 5 upon selection of a go back option 724.

As discussed above, while in some embodiments, a user may utilize a graphical user interface for marking a current position in an information tree, these are nonlimiting examples. More specifically, in at least one exemplary embodiment, no interface need be provided for marking a current location in an information tree. If a user is navigating the information tree, the user may provide the previously stored marker to the communications device 102, 104, 106. Depending on the particular configuration, the communications device 102, 104, 106 and/or the interface server 218 may store the marked position in the information tree.

More specifically, as an additional nonlimiting example, if the user has created an audio marker that includes the user's voice saying "take me home," the user can simply say the phrase "take me home" for marking the current position, without being prompted. If the user says the phrase "take me home" again, the user may return to the marked position (in this communication session or in another).

One should also note that, referring back to FIG. 4, a user may be presented with a graphical representation of the information tree. In at least one embodiment, an icon may be displayed on that interface to illustrate the user's current position in the information tree. The user may also be provided options to insert a marker as audio data, image data, control data, and/or video data at one or more locations in the information tree. By inserting a marker on the interface, the user can mark this position such that if the user wishes to return to this position at a later time, the user may simply "click," say, and/or otherwise provide the marker being displayed.

More specifically, as a nonlimiting example, If the marker is associated with audio data, the user can return to the marked position by repeating the audio data (by voice, recording, etc.) to the communications device 102, 104, 106 (and/or to the interface server 218).

Figure 8:
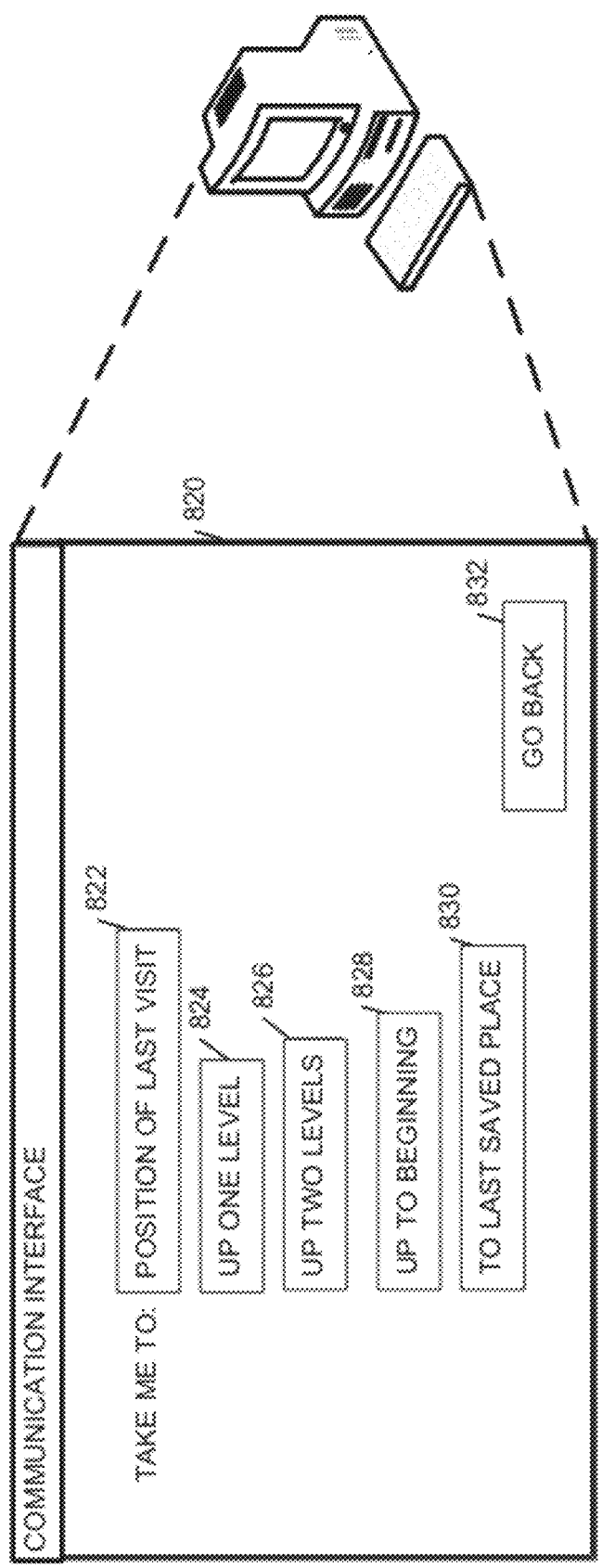
FIG. 8 is a diagram illustrating a user interface that may facilitate resumption of an IVR session, similar to the interface from FIG. 7.

FIG. 8 is a diagram illustrating a user interface that may facilitate resumption of an IVR session, similar to the interface 720 from FIG. 7. As illustrated in the nonlimiting example of FIG. 8, a communication interface 820 may be presented to a user in response to selection of the take me option 536 (FIG. 5). The communication interface 820 may include one or more options for taking the user to a desired point in an information tree. More specifically, the interface 820 includes a position of last visit option 822, which may be configured to return the user to the last position reached during the user's last visit to the information tree. Additionally included is an up one level option 824 for taking the user to a previous tier in the information tree (e.g., from a current position at tier 2 to a position in tier 1). An up two levels option 826 may be configured to take the user up two tiers from the current tier in the information tree. An up to beginning option 828 may be configured for returning the user to the beginning of the information tree. A "to last saved place" option 830 may also be included and configured to return the user to the last place in the information tree that was marked by the user. A go back option 832 may be configured to return the user to the interface 520 from FIG. 5.

One should note that while options associated with the information tree may be presented in a user interface, such as the interface from FIG. 8, this is a nonlimiting example. More specifically, in at least one exemplary embodiment, a user of the communications device 102, 104, 106 may be configured to receive a predetermined aural thumbnail for one or more of the options in FIG. 8. As a nonlimiting example, a predetermined aural thumbnail for taking the user to the position of last visit may have been set to audio data associated with "The Star Spangled Banner." The aural thumbnail may be presented to the communications device 102, 104, 106 via the user's voice, a recording, and/or other techniques for presentation of the aural thumbnail. Upon receipt of the desired audio data, the communications device 102, 104, 106 can retrieve data associated with the previous visit to navigate the information tree to the desired position.

Additionally included in exemplary embodiments described herein are configurations for facilitating the creation of a command and/or command assignment for performing actions with an IVR. More specifically, as a nonlimiting example, the communications device 102, 104, 106 may be configured to receive a command from a user. The command may include an audio command, a video command, a DTMF command, an image command, and/or other command. The communications device 102, 104, 106 (and/or the interface server 218) may then determine a command assignment to desired interface action. This data can be stored such that when the communications device 102, 104, 106 receives the command, the received command can be used to determine the desired interface action.

More specifically, as an additional nonlimiting example, if a user selects a key sequence to represent a command to automatically connect with a representative (e.g., bypassing the IVR), the user may create a command (e.g., the desired key sequence) and a command assignment (e.g., the desired outcome). A determination can be made (by the communications device 102, 104, 106 and/or the interface server 218) regarding the actions that may be implemented to achieve the desired outcome. Once the command, command assignment and interface actions are set, the user can input the command to the communications device 102, 104, 106 to initiate the desired actions.

One should note that the above nonlimiting example may be implemented via a graphical user interface, an audio interface, and/or may be pre-configured by the communications device 102, 104, 106. Additionally, while at least a portion of the logic may reside at the communications device 102, 104, 106, this is also a nonlimiting example. In at least one exemplary embodiment at least a portion of the logic may reside at the interface server 218.

One should also note that, while some embodiments may include logic in the communications device 102, 104, 106 for receiving a marker, aural thumbnail, etc. and navigating an information tree, these are nonlimiting examples. More specifically, in at least one configuration, the interface server 218 and associated IVR may include logic for facilitating the capture and presentation of the thumbnail, marker, and/or command to perform the desired actions.

As discussed above, some embodiments may be configured such that communications device 102, 104, 106 includes logic for facilitating association of the image, audio, and/or video data with an IVR. As such, some embodiments may be configured to provide one or more of the options discussed in FIGS. 5-8 prior to (or during) interaction with the IVR. Selection of options from FIGS. 5-8 may be made via a "point and click" interaction with a GUI, via a predetermined key sequence, and/or other techniques for selection.

Figure 9:
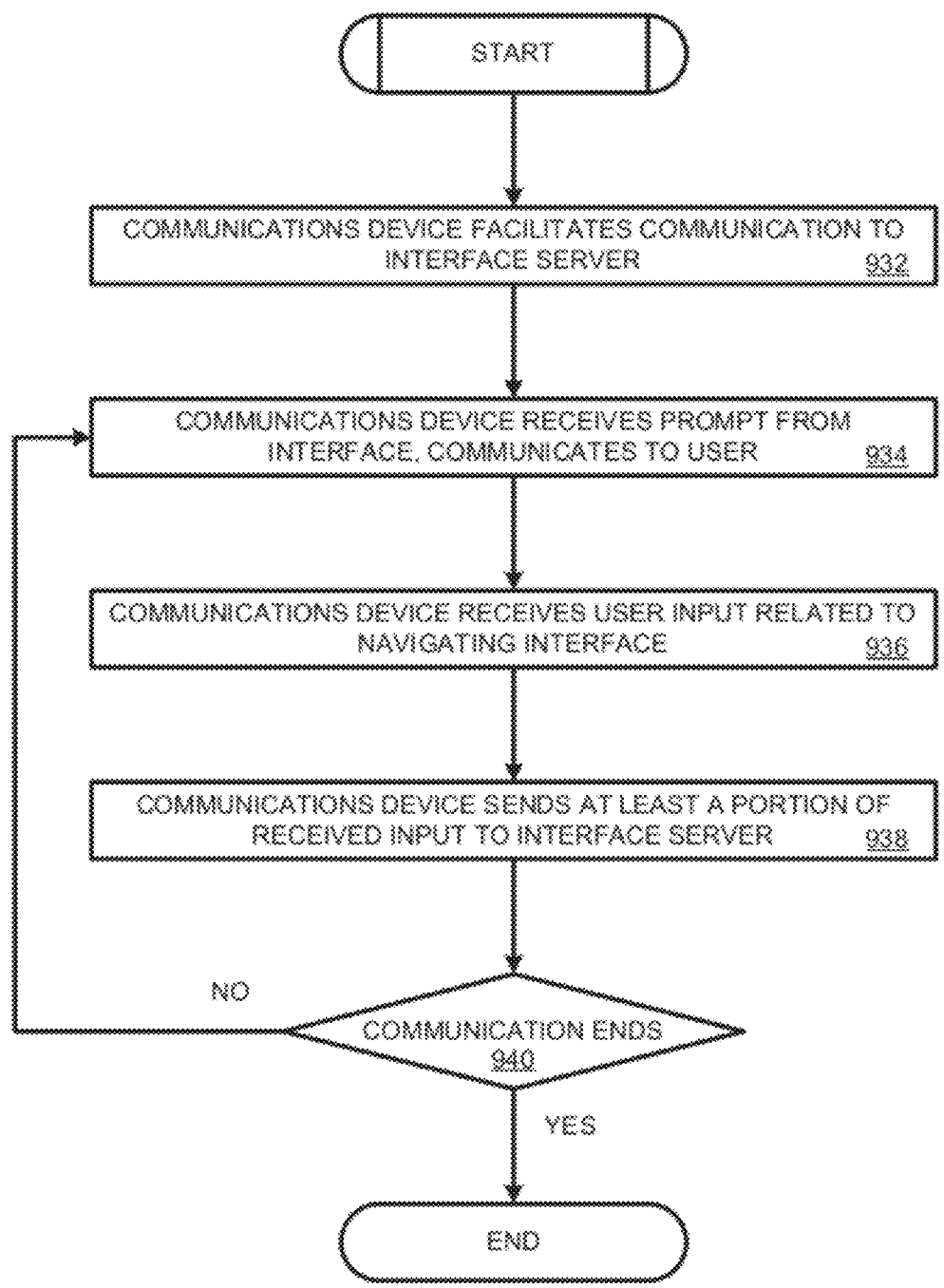
FIG. 9 is a flowchart illustrating an exemplary embodiment of a process that may be utilized for navigating an IVR, such as may be provided by the interface server from FIG. 4.

FIG. 9 is a flowchart illustrating an exemplary embodiment of a process that may be utilized for navigating an IVR, such as may be provided by the interface server 218 from FIG. 4. As illustrated in the nonlimiting example of FIG. 9, the communications device 102, 104, 106 can facilitate a communication to an interface, such as an information tree (block 932). The communications device 102, 104, 106 can receive a prompt from the interface server 218 and communicate the prompt to the user (block 934). The communications device 102, 104, 106 can then receive user input related to navigating the interface (block 936). The communications device 102, 104, 106 can send at least a portion of the received input to the interface server 218 (block 938). The communications device 102, 104, 106 can determine whether the communications session has ended (block 940). If not, the flowchart returns to block 934. If the communications session has ended, the process may end.

Figure 10:
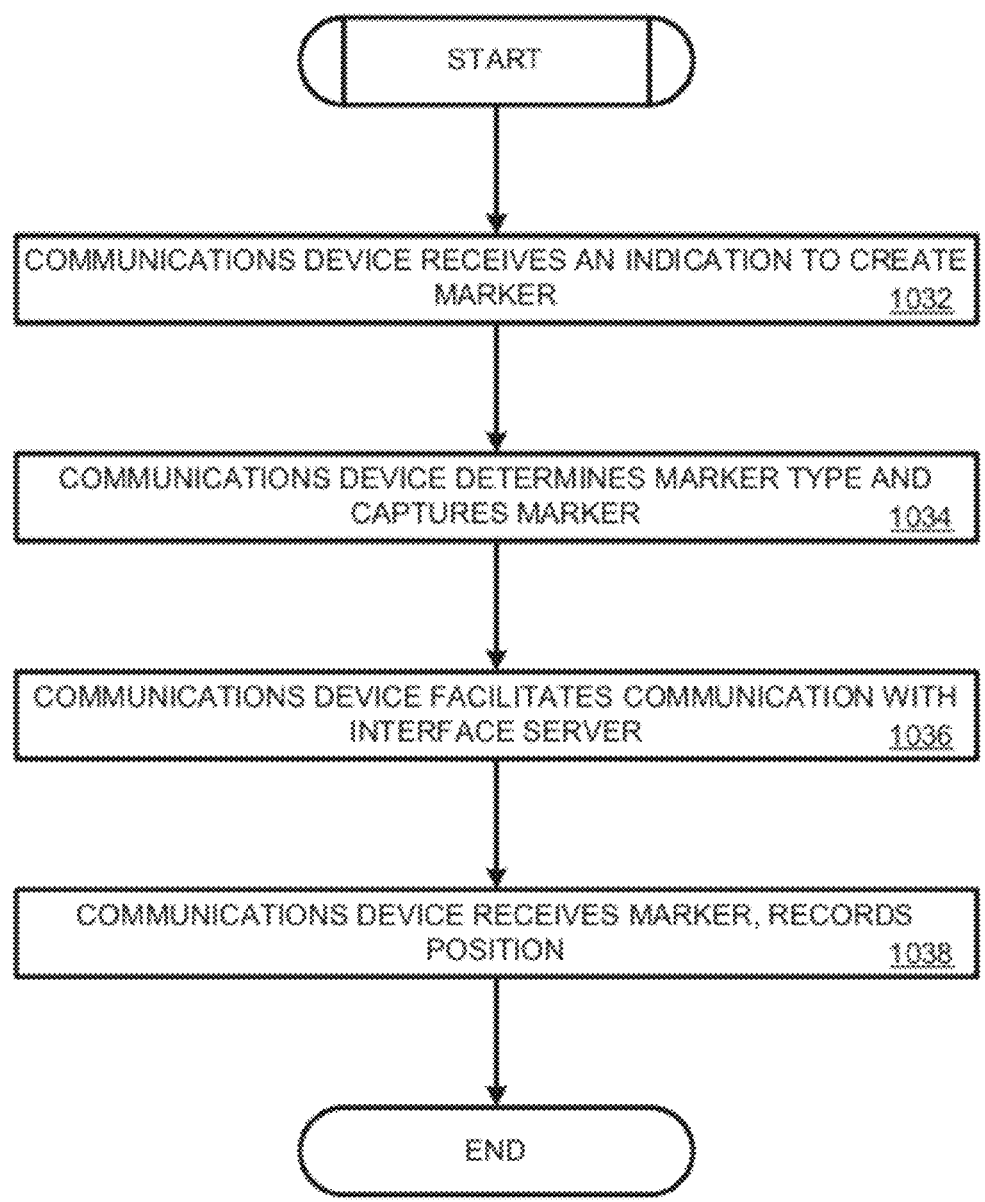
FIG. 10 is a flowchart illustrating an exemplary embodiment of a process that may be utilized for creating a marker for an IVR, similar to the flowchart from FIG. 9.

FIG. 10 is a flowchart illustrating an exemplary embodiment of a process that may be utilized for creating a marker for an IVR, similar to the flowchart from FIG. 9. As illustrated in the nonlimiting example of FIG. 10, the communications device 102, 104, 106 can receive an indication to create a marker (block 1032). The communications device 102, 104, 106 can determine the marker type and capture the marker (block 1034). The communications device 102, 104, 106 can facilitate a communication with the interface server 218 (block 1036). The communications device 102, 104, 106 can receive a marker from the user and can record the user's position with respect to an information tree provided by the interface server 218 (block 1038).

Figure 11:
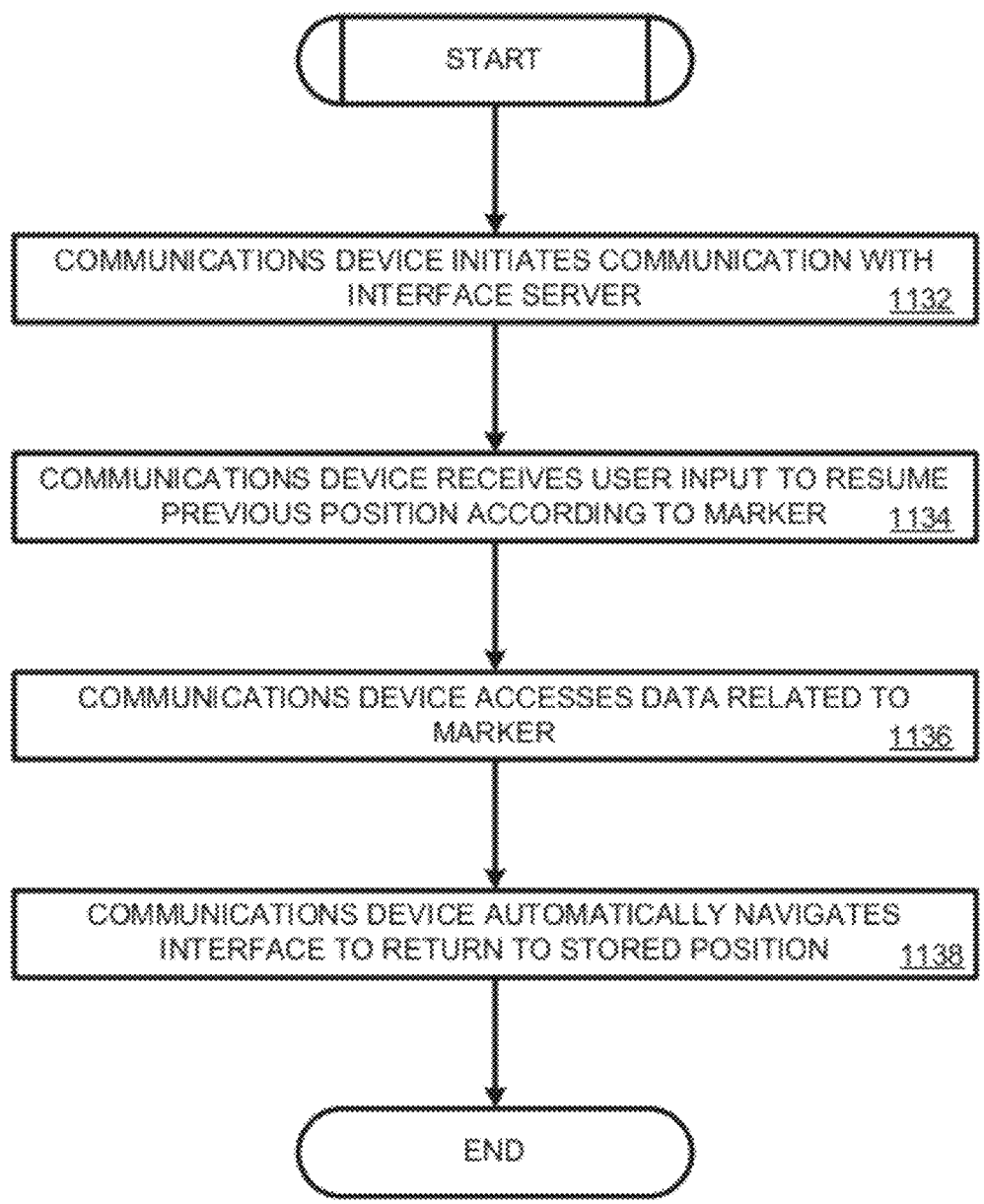
FIG. 11 is a flowchart illustrating an exemplary embodiment of a process that may be utilized for resuming an IVR session, similar to the flowchart from FIG. 10.

FIG. 11 is a flowchart illustrating an exemplary embodiment of a process that may be utilized for resuming an IVR session, similar to the flowchart from FIG. 10. As illustrated in the nonlimiting example of FIG. 11, the communications device 102, 104, 106 can initiate a communication with the interface server 218 (block 1132). The communications device 102, 104, 106 can receive user input related to resuming a previous position according to a previously captured marker (block 1134). The communications device 102, 104, 106 can access data related to the marker (block 1136). The communications device 102, 104, 106 can automatically navigate the IVR to return to the stored position (block 1138).

One should note that while, in some embodiments the interface server 218 may include logic for automatically taking the user back to the marked position, in this nonlimiting example, the communications device 102, 104, 106 includes logic to automatically navigate the information tree to reach the desired location. The navigation can include one or more Dual Tone Multi-Frequency (DTMF), voice commands, and/or other commands that are stored on the communications device 102, 104, 106. The communications device 102, 104, 106 can then send the command(s) to the interface server 218 to navigate to the desired position.

Figure 12:
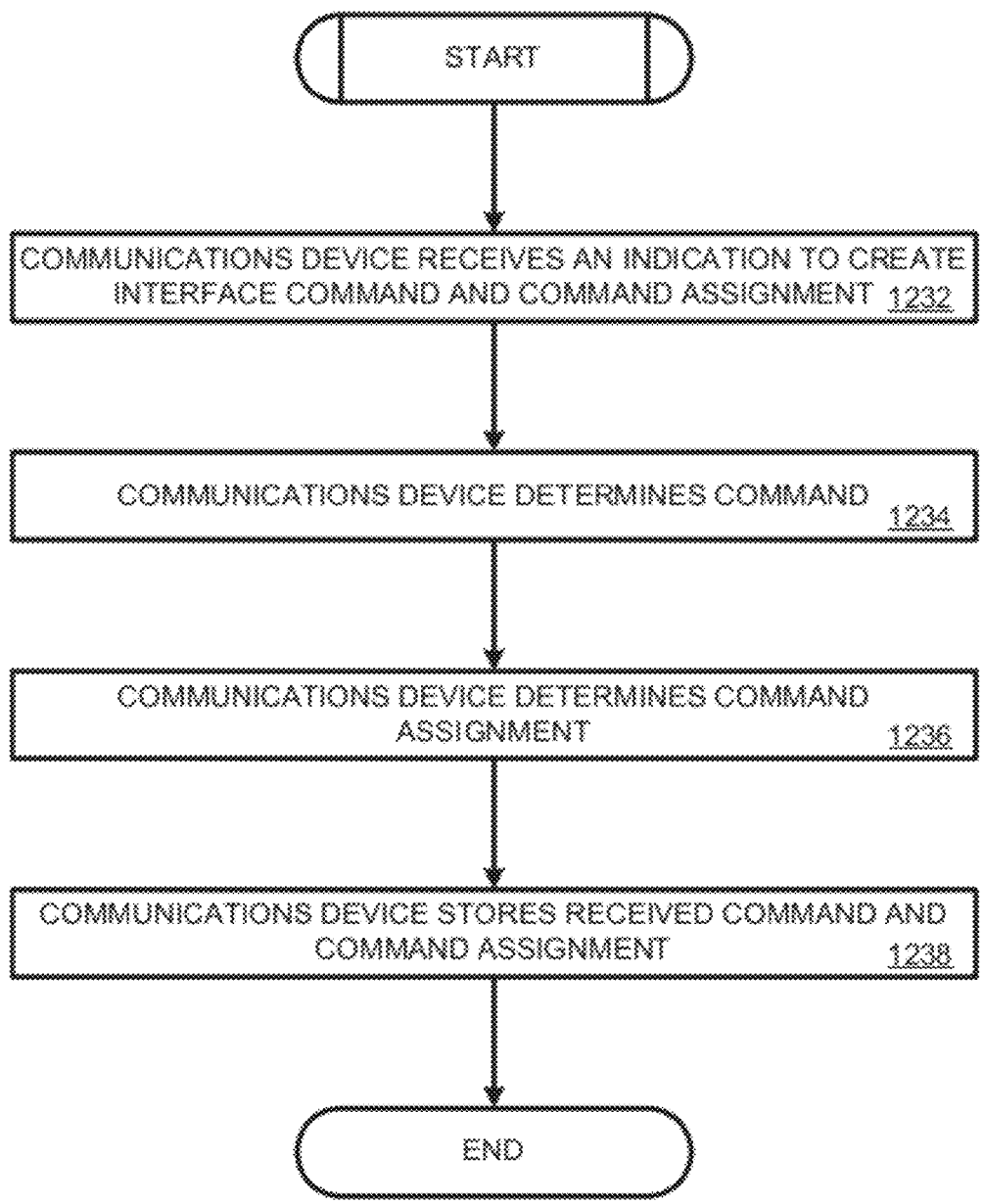
FIG. 12 is a flowchart illustrating an exemplary embodiment of a process for receiving a command and command assignment for implementation in an IVR session, similar to the flowchart from FIG. 11.

FIG. 12 is a flowchart illustrating an exemplary embodiment of a process for receiving a command and command assignment for implementation in an IVR session, similar to the flowchart from FIG. 11. As illustrated in the nonlimiting example of FIG. 12, the communications device 102, 104, 106 can receive an indication to create an interface command and a command assignment (block 1232). The communications device 102, 104, 106 can then determine the command that will be associated with the command assignment (block 1234). The communications device 102, 104, 106 can then determine a command assignment that will be associated with the determined command (block 1236). The communications device 102, 104, 106 can store the received command and command assignment (block 1238).

As indicated above, in at least one exemplary embodiment, the user can define commands that can be assigned to IVR actions. More specifically, a user can assign a sound, image, video, etc. to signify an action when the user interacts with the IVR.

Figure 13:
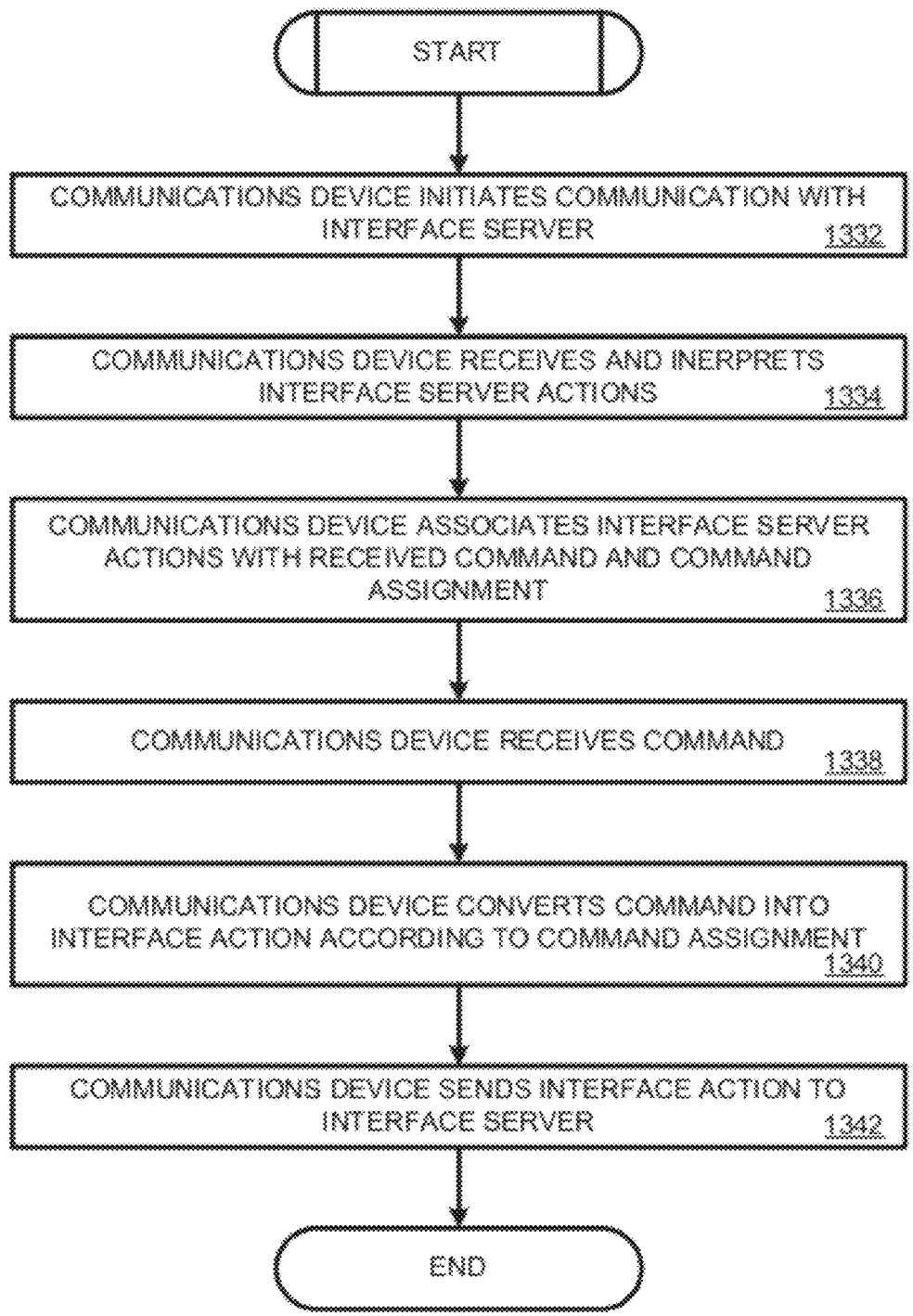
FIG. 13 is a flowchart illustrating an exemplary embodiment of a process for utilizing a command and command assignment in an IVR session, similar to the flowchart from FIG. 12.

FIG. 13 is a flowchart illustrating an exemplary embodiment of a process for utilizing a command and command assignment in an IVR session, similar to the flowchart from FIG. 12. As illustrated in the nonlimiting example of FIG. 13, the communications device 102, 104, 106 can initiate a communication with the interface server 218 (block 1332). The communications device 102, 104, 106 can receive and interpret at least one interface server action (block 1334).

The communications device 102, 104, 106 can associate the interface actions with a command and command assignment (block 1336) The communications device 102, 104, 106 can receive a command from the user, the command being associated with the IVR (block 1338). The communications device 102, 104, 106 can convert the command into an interface action according to a previously configured command assignment (block 1340). As discussed above, the communications device 102, 104, 106 can be configured with a command and command assignment to provide IVR navigation options for the user. While the command and command assignments may be configured by the user, this is not a requirement, as in at least one exemplary embodiment the communications device 102, 104, 106 can be configured with commands and command assignments without user input.

The communications device 102, 104, 106 can be configured to convert the command into an interface action according to the command assignment (block 1340). The communications device 102, 104, 106 can then send the interface action to the interface server 218 (block 1342).

Figure 14:
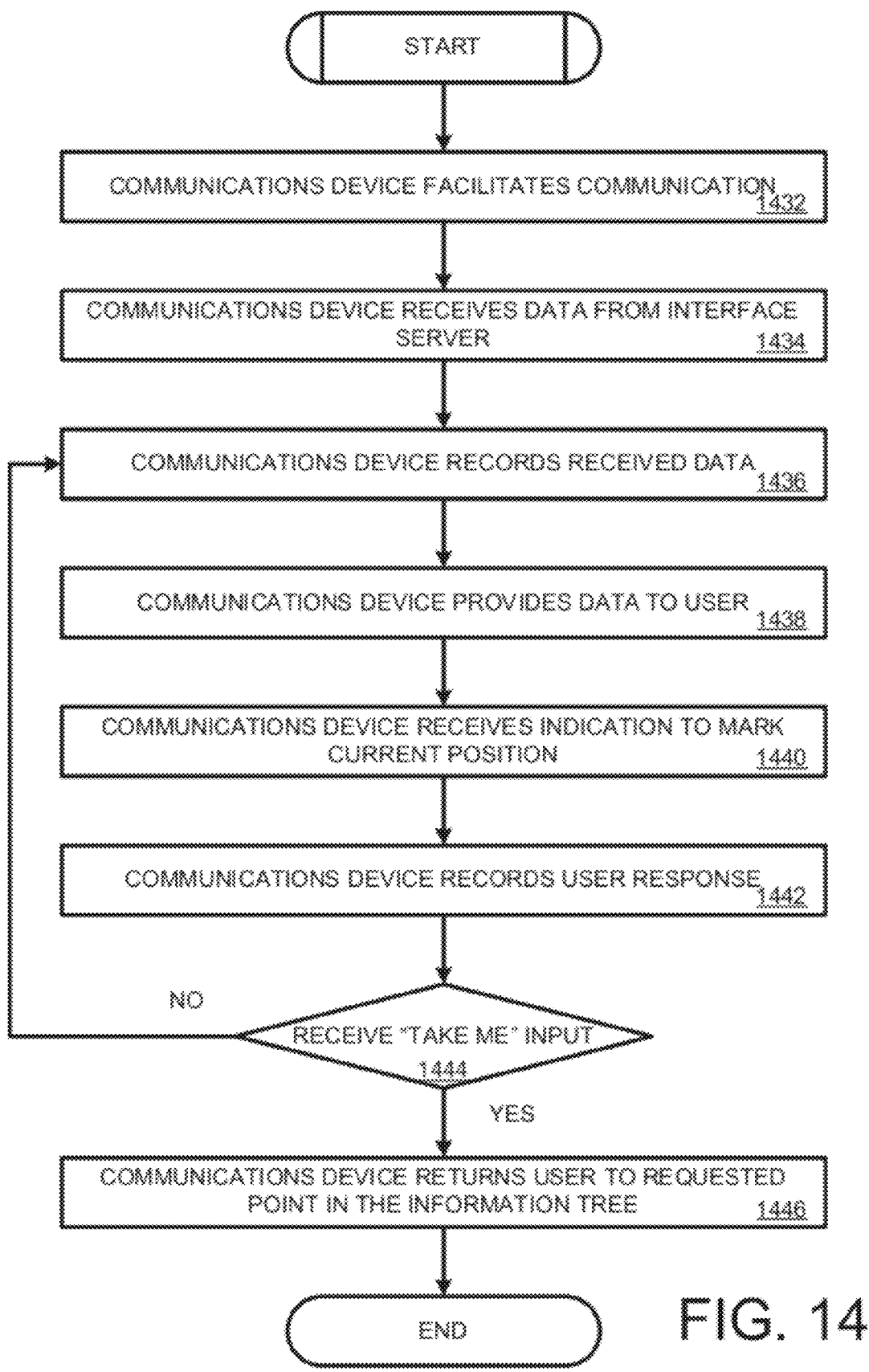
FIG. 14 is a flowchart illustrating an exemplary embodiment of a process for returning a user to a desired point in an IVR menu, similar to the flowchart from FIG. 13.

FIG. 14 is a flowchart illustrating an exemplary embodiment of a process for returning a user to a desired point in an IVR menu, similar to the flowchart from FIG. 13. As illustrated in the nonlimiting example of FIG. 14, the communications device 102, 104, 106 can facilitate communications with the interface server 218 (block 1432). The communications device 102, 104, 106 can receive data from the interface server 218 (block 1434). The communications device 102, 104, 106 can record the received data (block 1436). The communications device 102, 104, 106 can provide the received data to the user (block 1438). The communications device 102, 104, 106 can receive a user indication to mark the current position in the information tree (block 1440). The communications device 102, 104, 106 can record the user response (block 1442). The communications device 102, 104, 106 can then determine whether the received user input includes an instruction to proceed to a different point in the information tree, as described above (block 1444). If the received user response is not a "take me" input (as described above), the flowchart can return to block 1436. If the received response is a "take me" input, the communications device can return the user to the requested point in the information tree (block 1446).

Figure 15:
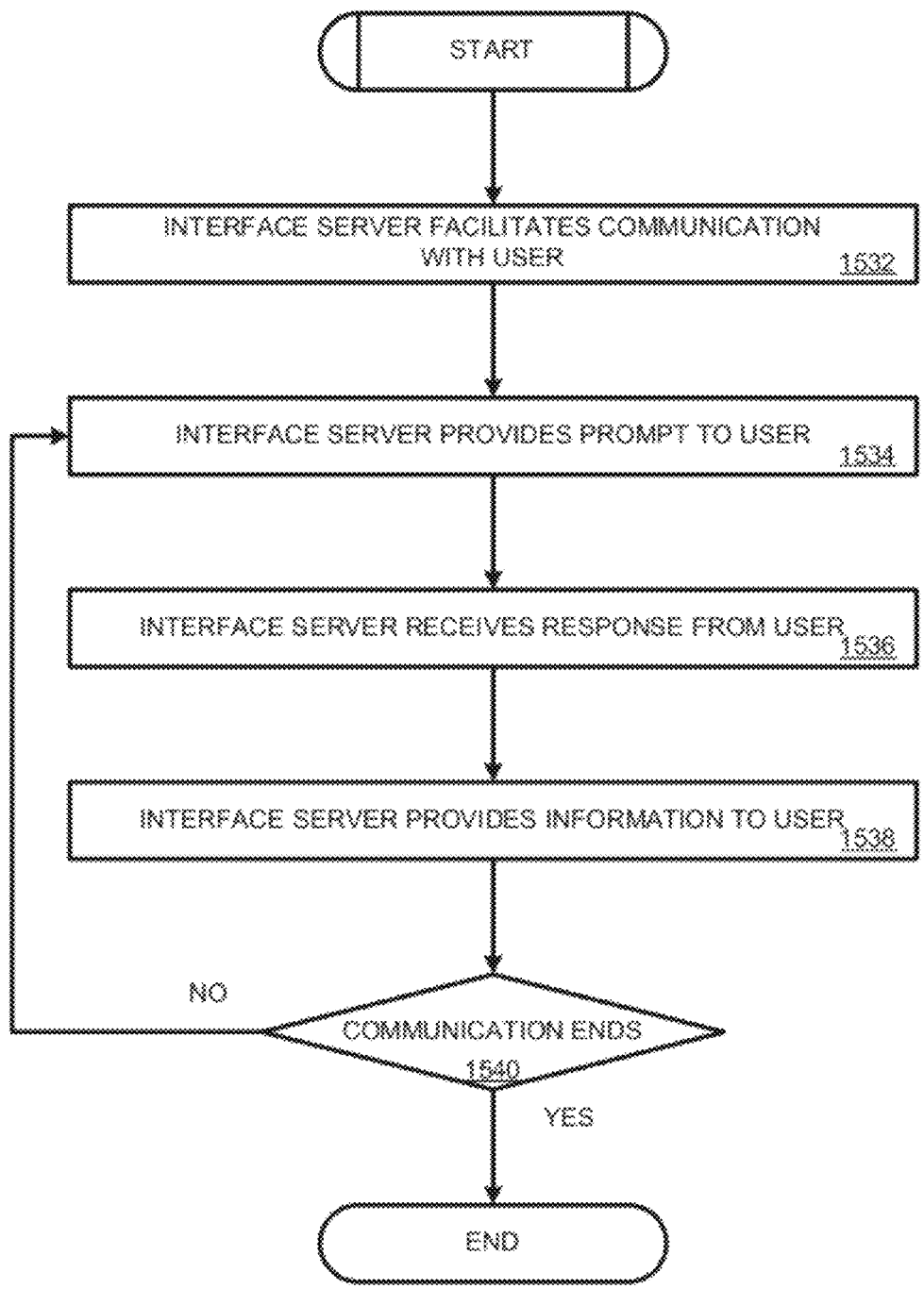
FIG. 15 is a flowchart illustrating an exemplary embodiment of a process for an interface server to provide an IVR session to a user, similar to the flowchart from FIG. 14.

FIG. 15 is a flowchart illustrating an exemplary embodiment of a process for an interface server to provide an IVR session to a user, similar to the flowchart from FIG. 14. As illustrated in the nonlimiting example of FIG. 15, the interface server 218 can facilitate a communication with the user device 102, 104, 106 (block 1532). The interface server 218 can then provide a prompt for the user (block 1534). The interface server 218 can receive a response from the user (block 1536). The interface server 218 can provide additional information to the user (block 1538). The interface server 218 can then determine whether the communication has ended (block 1540). If not, the flowchart returns to block 1534.

Figure 16A:
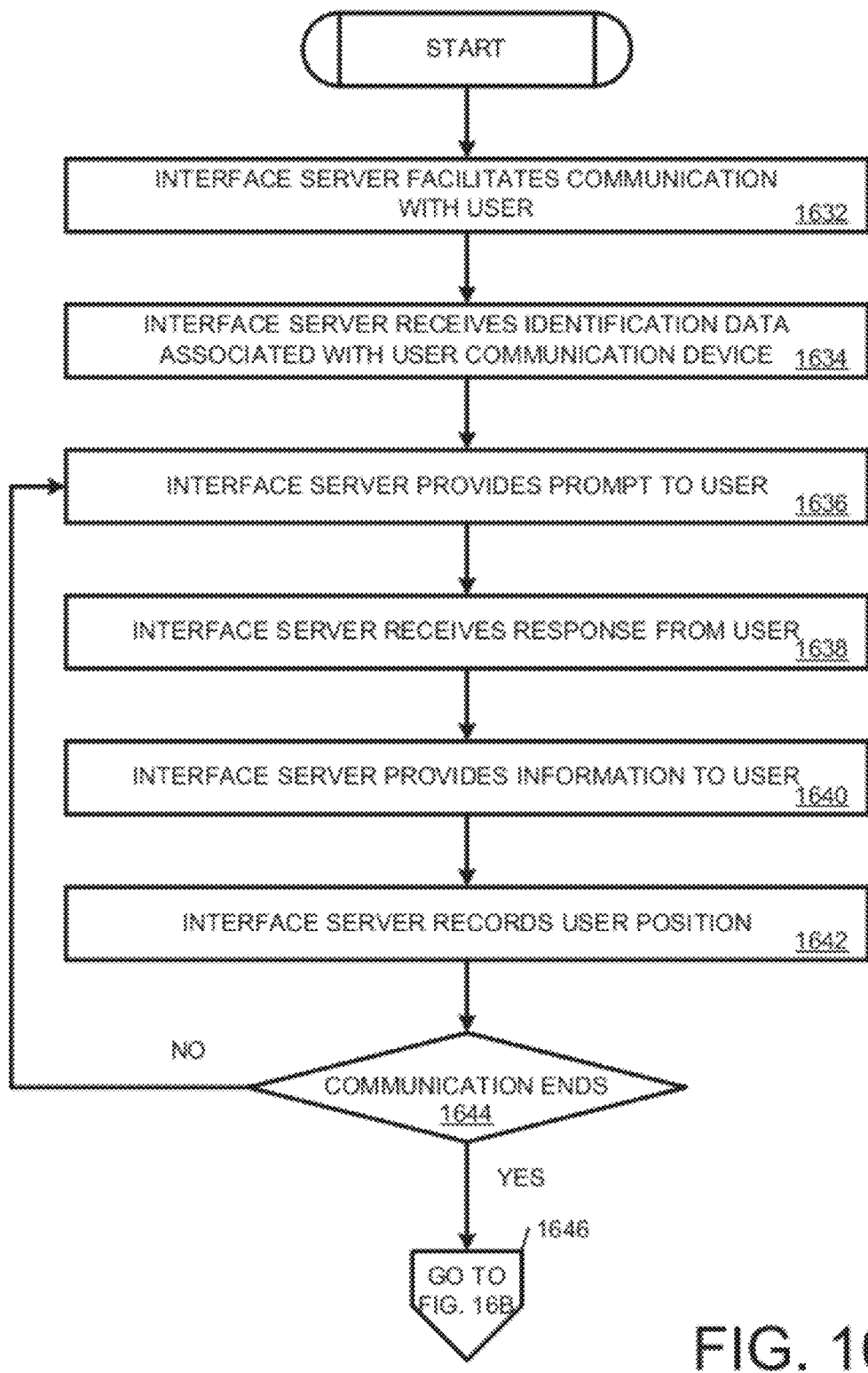
FIG. 16A is a flowchart illustrating an exemplary embodiment of a process for an interface server to record a user position during an IVR session, similar to the flowchart from FIG. 15.

FIG. 16A is a flowchart illustrating an exemplary embodiment of a process for an interface server to record a user position during an IVR session, similar to the flowchart from FIG. 15. As illustrated in the nonlimiting example of FIG. 16A, the interface server 218 can facilitate a communication with a user (block 1632). The interface server 218 can receive identification data associated with the communication device 102, 104, 106 (block 1634). The interface server 218 can provide a prompt to the user (block 1636). The interface server 218 can receive a response from the user (block 1638). The interface server 218 can then provide information to the user (block 1640). The interface server 218 can record a user position in the information tree (block 1642). The interface server 218 can determine whether the communication has ended (block 1644). If not, the flowchart returns to block 1636. If the communication has ended, the flowchart proceeds to jump block 1646.

Figure 16B:
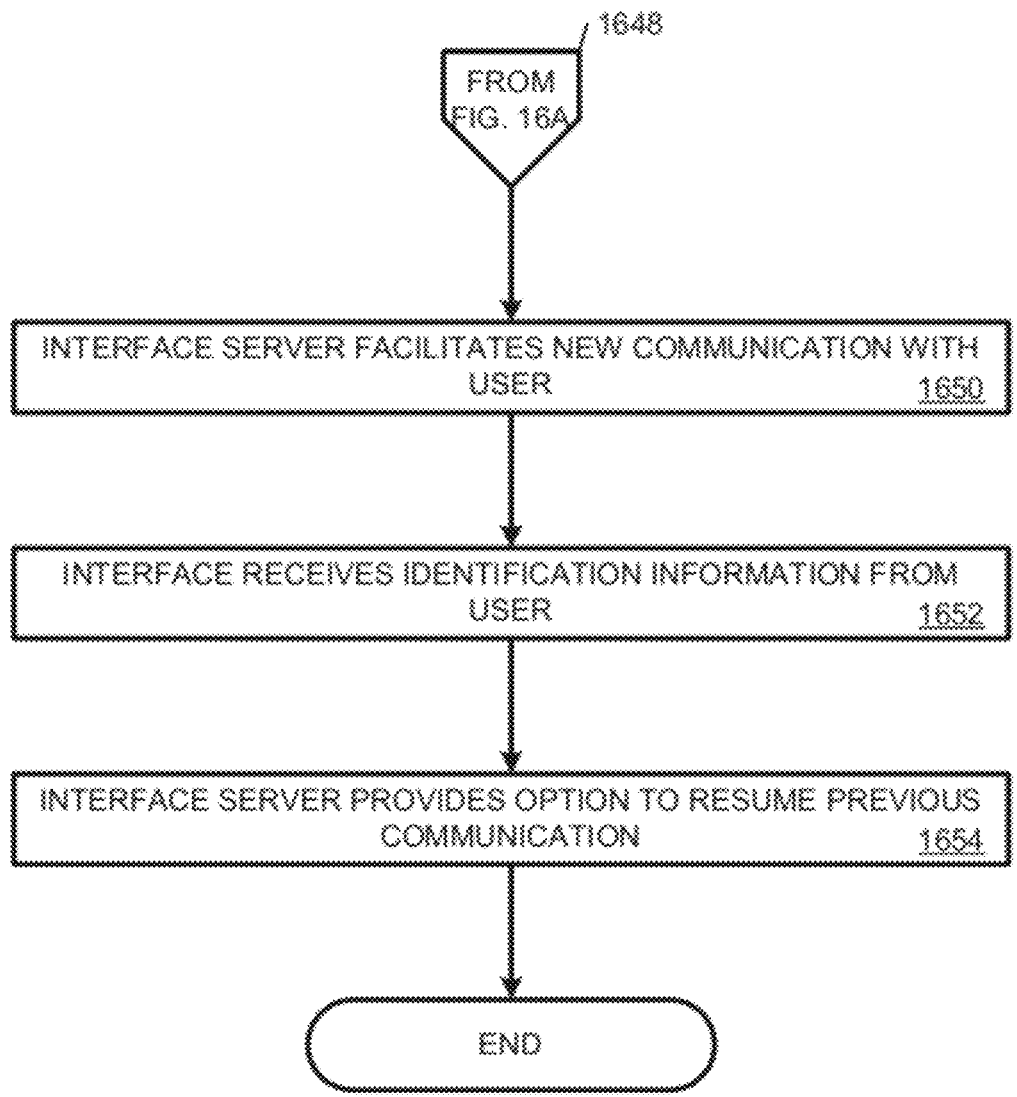
FIG. 16B is a continuation of the flowchart from FIG. 16A.

FIG. 16B is a continuation of the flowchart from FIG. 16A. More specifically, from jump block 1648, the interface server 218 can facilitate a new communication with the user (block 1650). The interface server 218 can receive identification information from the user (block 1652). The information can include callerID information, IP address information, and/or other authenticating information. The interface server 218 can then provide an option to resume a previous communication (block 1654). If the user desires to resume a previous communication, the interface server 218 can determine the previously stored position in the information tree and return the user to that location.

Figure 17:
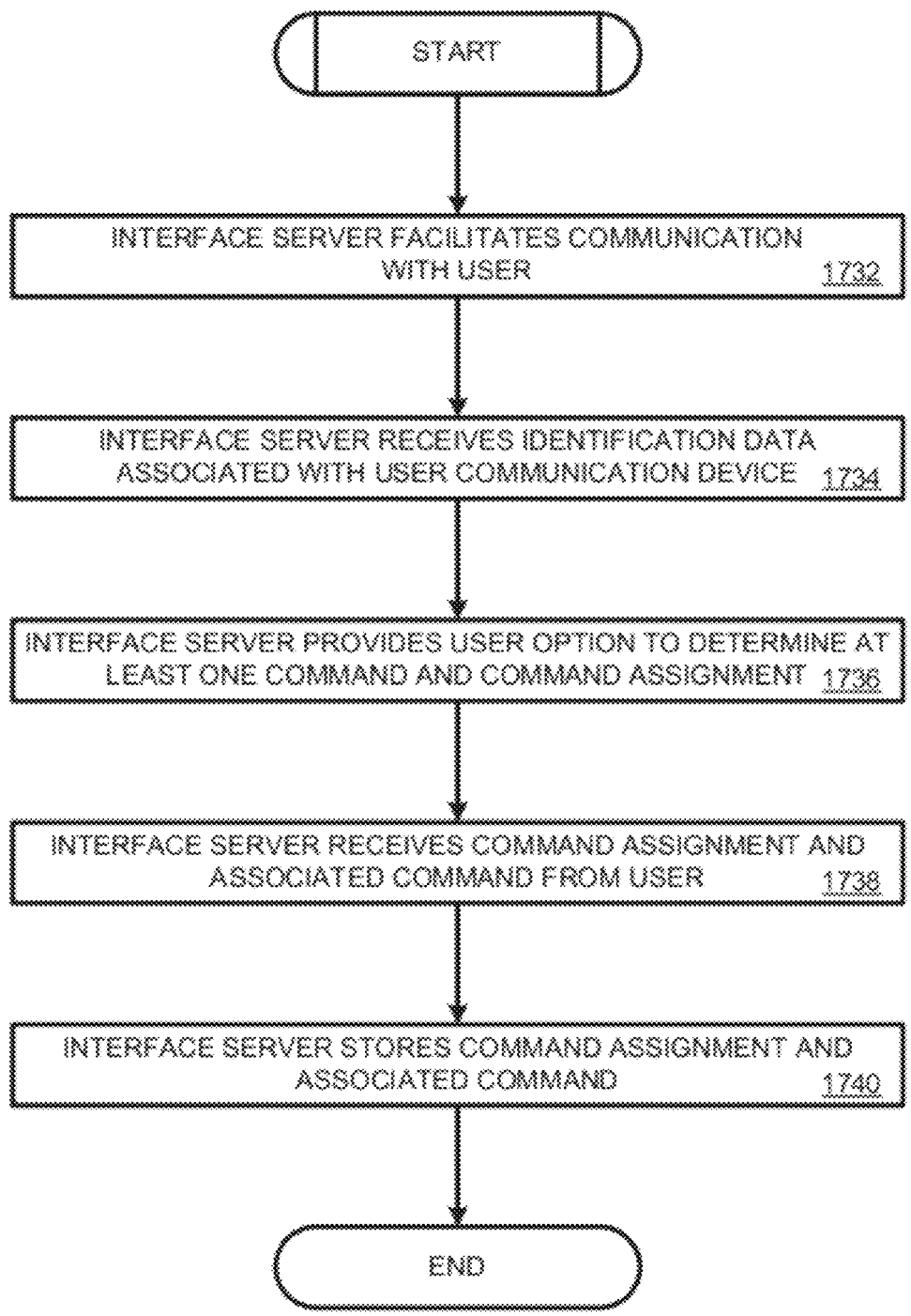
FIG. 17 is a flowchart illustrating an exemplary embodiment of a process for an interface server to receiving a command and command assignment, similar to the flowchart from FIGS. 16A and 16B.

FIG. 17 is a flowchart illustrating an exemplary embodiment of a process for an interface server to receive a command and command assignment, similar to the flowchart from FIGS. 16A and 16B. As illustrated in the nonlimiting example of FIG. 17, the interface server 218 can facilitate a communication with a user (block 1732). The interface server 218 can receive identification data associated with a user communication device (block 1734). The interface server 218 can provide a user option to determine at least one command and command assignment (block 1736). The interface server 218 can receive a command assignment and associated command from the user (block 1738). The interface server 218 can store the command assignment and associated command (block 1740). As discussed above, a determination may also be made as to the one or more actions to achieve the desired result associated with the command and command assignment.

Figure 18:
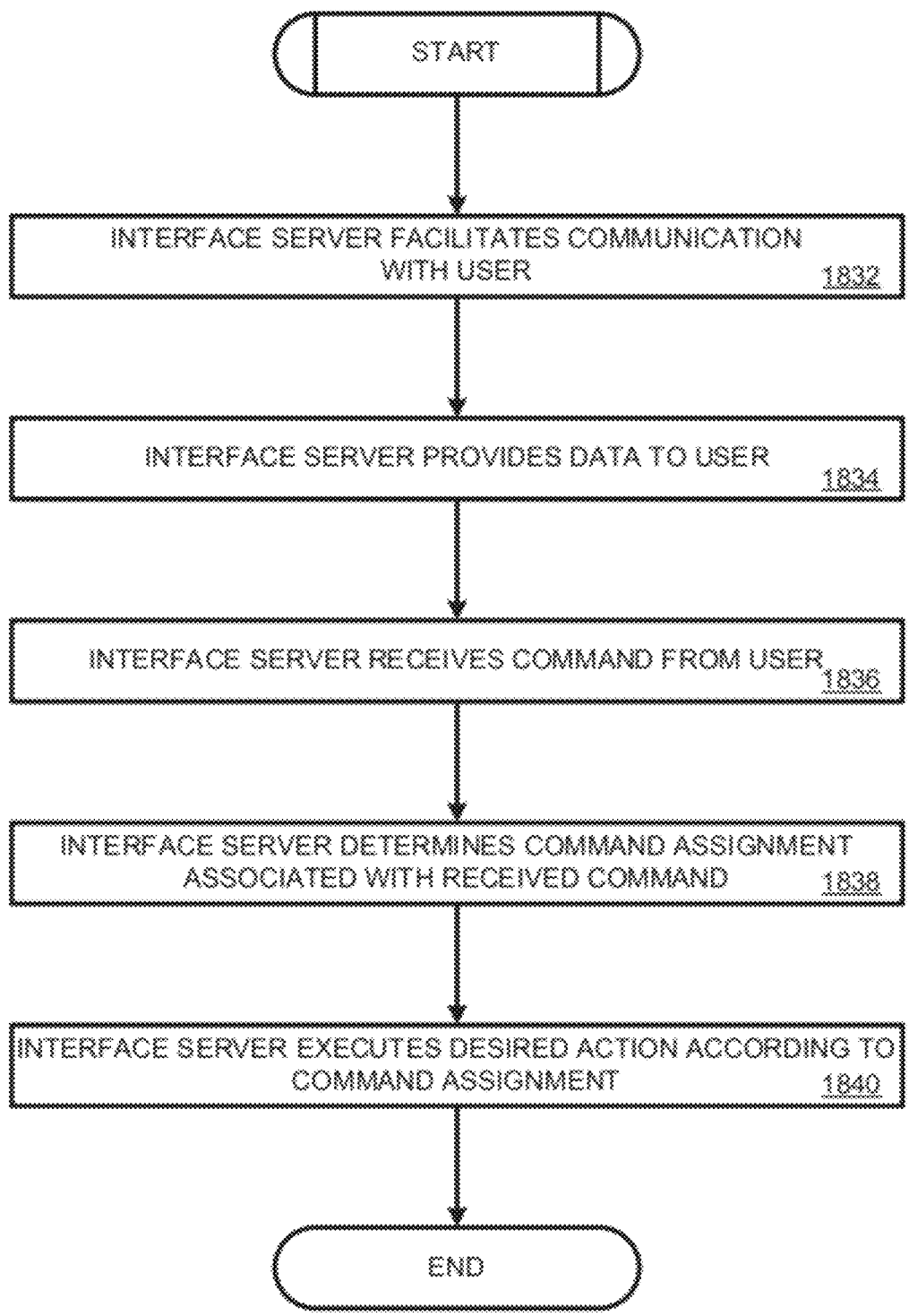
FIG. 18 is a flowchart illustrating an exemplary embodiment of a process for an interface server to execute a desired command according to a command assignment, similar to the flowchart from FIG. 19.
Figure 19:
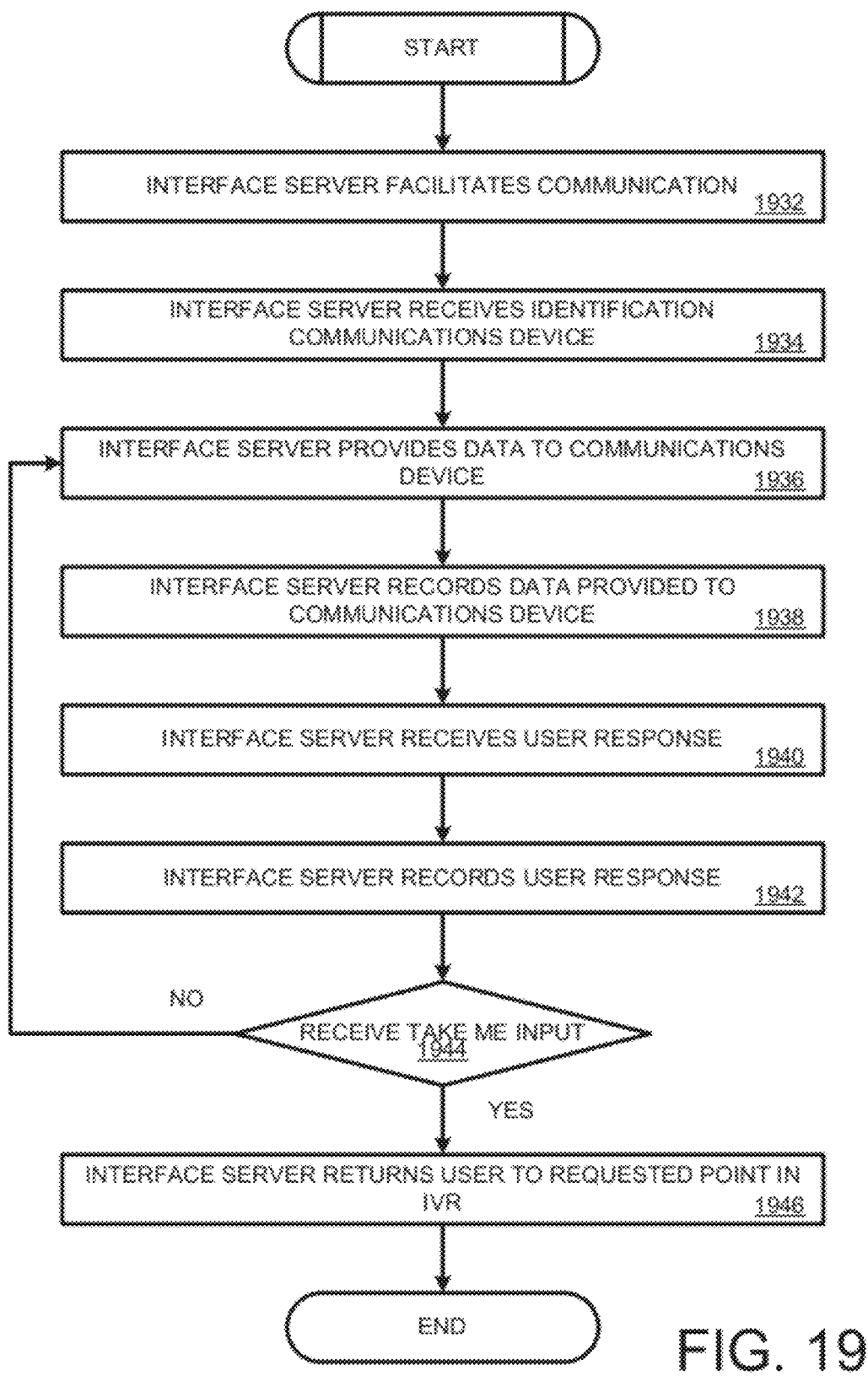
FIG. 19 is a flowchart illustrating an exemplary embodiment of a process for an interface server to return a user to a desired point in an IVR, similar to the flowchart from FIG. 18.

FIG. 18 is a flowchart illustrating an exemplary embodiment of a process for an interface server to execute a desired command according to a command assignment, similar to the flowchart from FIG. 19. As illustrated in the nonlimiting example of FIG. 18, the interface server 218 can facilitate a communication with the user (block 1832). The interface server 218 can provide data to the user (block 1834). As discussed above, the data provided to the user can include data associated with an information tree. The interface server 218 can then receive a command from the user (block 1836). The interface server 218 can determine a command assignment associated with the received command (block 1838). The interface server 218 can execute the desired action according to the command assignment (block 1840).

FIG. 19 is a flowchart illustrating an exemplary embodiment of a process for an interface server to return a user to a desired point in an IVR, similar to the flowchart from FIG. 18. As illustrated in the nonlimiting example of FIG. 19, the interface server 218 can facilitate a communication with a user (block 1932). The interface server 218 can receive identification information from the communications device 102, 104, 106 (block 1934). The interface server 218 can provide data to the communications device 102, 104, 106 (block 1936). The interface server 218 can record data provided to the communications device 102, 104, 106 (block 1938). The interface server 218 can receive a user response (block 1940). The interface server 218 can record the received user response (block 1942). The interface server 218 can then determine whether "take me" input has been received from the user (block 1944). If no such input has been received, the flowchart returns to block 1936. If "take me" input has been received, as indicated above, the interface server 1946 can return the user to the requested point in the IVR (block 1946)

FIG. 20A is a sequence diagram illustrating an exemplary embodiment of a process for providing a setting for an IVR, such as may be provided by the interface server 218 from FIG. 3. As illustrated in the nonlimiting example of FIG. 20A, the user can initiate activation of the communications device 102, 104, 106 (arrow 2032). The communications device 102, 104, 106 can provide an option to define at least one command and/or command setting (arrow 2034). The user can define at least one command and/or command setting (arrow 2036). The user can initiate a communication with the interface server 218 (arrow 2038). The communications device 102, 104, 106 can connect with the interface server 218 (arrow 2040). The communications device 102, 104, 106 can provide identification information, the command and/or the command setting to the interface server 218 (arrow 2042).

FIG. 20B is a continuation of the sequence diagram from FIG. 20A. More specifically, continuing from FIG. 20A, the interface server 218 can provide data and/or a user prompt (arrow 2044). The communications device 102, 104, 106 can provide the option to the user (arrow 2046). The user can respond to the option with the command (arrow 2048). The communications device 102, 104, 106 can send the command to the interface server 218 (arrow 2050). The interface server 218 determines actions that may be utilized according to the command and executes the actions accordingly (arrow 2052). The communication can then be terminated (arrow 2054).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method, comprising:
prompting a user to provide a marker, the user being able to provide different versions of the marker;
receiving a version of the marker from the user; and
associating, with a processor, the version of the marker received from the user with a particular position in an information tree and storing the particular position in the information tree associated with the version of the marker,
wherein a subsequent input of a new version of the marker by the user causes a server to navigate to the particular position in the information tree that has been stored and associated with the version of the marker received from the user.

2. The method of claim 1, wherein the marker includes one of audio data, image data, control data, and video data.

3. The method of claim 1, further comprising directing the user to the particular position in the information tree that is associated with the marker.

4. The method of claim 1, further comprising determining the marker that is configured to mark the particular position in the information tree.

5. The method of claim 4, wherein determining the marker includes one of capturing audio data, capturing image data, capturing video data, finding audio data, finding image data, and finding video data.

6. The method of claim 1, wherein receiving the version of the marker from the user further comprises capturing an audio recording of a word spoken by the user.

7. The method of claim 6, wherein the subsequent input of the new version of the marker comprises the user speaking the word at a subsequent time after the audio recording is captured.

8. A tangible computer readable storage medium encoded with an executable computer program for facilitating communications between a user and an interface and that, when executed by a processor, causes the processor to perform operations comprising:
prompting the user to provide a marker, the user being able to provide different versions of the marker;
receiving a version of the marker from the user; and
associating the version of the marker received from the user with a particular position in an information tree and store the particular position in the information tree associated with the version of the marker,
wherein a subsequent input of a new version of the marker by the user causes a server to navigate to the particular position in the information tree that has been stored and associated with the version of the marker received from the user.

9. The tangible computer readable storage medium of claim 8, wherein the marker includes one of audio data, image data, control data, and video data.

10. The tangible computer readable storage medium of claim 8, the operations further comprising directing the user to the particular position in the information tree that is associated with the marker.

11. The tangible computer readable storage medium of claim 8, the operations further comprising determining the marker that is configured to mark the particular position in the information tree.

12. The tangible computer readable storage medium of claim 11, wherein determining the marker includes one of capturing audio data, capturing image data, capturing video data, finding audio data, finding image data, and finding video data.

13. The tangible computer readable storage medium of claim 8, wherein receiving the version of the marker from the user further comprises capturing an audio recording of a word spoken by the user.

14. The tangible computer readable storage medium of claim 13, wherein the subsequent input of the new version of the marker comprises the user speaking the word at a subsequent time after the audio recording is captured.

15. A server, comprising:
a processor; and
a memory storing instructions that cause the processor, when executed, to:
prompt a user to provide a marker, the user being able to provide different versions of the marker;
receive a version of the marker from the user; and
associate the version of the marker received from the user with a particular position in an information tree and store the particular position in the information tree associated with the version of the marker,
wherein a subsequent input of a new version of the marker by the user causes the server to navigate to the particular position in the information tree that has been stored and associated with the version of the marker received from the user.

16. The server of claim 15, wherein the marker includes one of audio data, image data, control data, and video data.

17. The server of claim 15, the instructions further causing the processor to direct the user to the particular position in the information tree that is associated with the marker.

18. The server of claim 15, the instructions further causing the processor to determine the marker that is configured to mark the particular position in the information tree.

19. The server of claim 18, wherein determining the marker includes one of capturing audio data, capturing image data, capturing video data, finding audio data, finding image data, and finding video data.

20. The server of claim 15, wherein receiving the version of the marker from the user further comprises capturing an audio recording of a word spoken by the user.

* * * * *